US012607911B2

(12) United States Patent
Endo et al.

(10) Patent No.: US 12,607,911 B2
(45) Date of Patent: Apr. 21, 2026

(54) IMAGE PICKUP APPARATUS CAPABLE OF EFFICIENTLY COOLING RECORDING MEDIUM WHILE PREVENTING SIZE INCREASE

(71) Applicant: CANON KABUSHIKI KAISHA, Tokyo (JP)

(72) Inventors: Yosaku Endo, Kanagawa (JP); Yuko Iritani, Tokyo (JP); Hayato Mano, Tokyo (JP); Kenta Ono, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 162 days.

(21) Appl. No.: 18/584,326

(22) Filed: Feb. 22, 2024

(65) Prior Publication Data

US 2024/0295799 A1 Sep. 5, 2024

(30) Foreign Application Priority Data

Mar. 3, 2023 (JP) ................................ 2023-032699

(51) Int. Cl.
*G03B 17/55* (2021.01)
*G03B 17/02* (2021.01)
*G03B 17/56* (2021.01)

(52) U.S. Cl.
CPC ............ *G03B 17/55* (2013.01); *G03B 17/02* (2013.01); *G03B 17/563* (2013.01); *G03B 2217/002* (2013.01)

(58) Field of Classification Search
CPC ...... G03B 17/55; G03B 17/02; G03B 17/563; G03B 2217/002; H04N 23/52
See application file for complete search history.

(56) References Cited

U.S. PATENT DOCUMENTS

| | | | | | |
|---|---|---|---|---|---|
| 2019/0154949 | A1* | 5/2019 | Hosoe | ................ | G05D 23/1919 |
| 2019/0174030 | A1* | 6/2019 | Kojima | .................. | H04N 23/54 |
| 2021/0055631 | A1* | 2/2021 | Mano | ................. | H05K 7/20418 |
| 2021/0377431 | A1* | 12/2021 | Oyama | .................. | H04N 23/52 |
| 2022/0294957 | A1* | 9/2022 | Iwasaki | .................. | H04N 23/68 |

FOREIGN PATENT DOCUMENTS

| | | |
|---|---|---|
| JP | 2022077037 A | 5/2022 |

* cited by examiner

*Primary Examiner* — Christopher E Mahoney

(74) *Attorney, Agent, or Firm* — Cowan, Liebowitz & Latman, P.C.

(57) ABSTRACT

An image pickup apparatus which is capable of efficiently cooling a recording medium while preventing size increase. A first board is substantially perpendicular to an optical axis direction. A second board is disposed parallel to the first board. A recording medium housing is mounted on the second board and is capable of housing the recording medium. A gripping portion is gripped when the image pickup apparatus is in use. A battery housing is arranged so as to overlap the gripping portion on projection when viewed from the optical axis direction and is capable of housing a battery. A first air-cooling duct is disposed between the battery housing and the second board. A fan generates an air current within the first air-cooling duct. The first air-cooling duct is thermally connected to at least one of the recording medium, the recording medium housing unit, and the second board.

21 Claims, 35 Drawing Sheets

IMAGE PICKUP APPARATUS CAPABLE OF EFFICIENTLY COOLING RECORDING MEDIUM WHILE PREVENTING SIZE INCREASE

BACKGROUND OF THE INVENTION

Field of the Invention

The present invention relates to an image pickup apparatus.

Description of the Related Art

In an image pickup apparatus, due to the increase in a resolution and a frame rate of recorded video images, the load of signal processing and the consumption power have been increasing, causing the amount of heat generated by an image pickup unit and a signal processing unit of a recording medium and the like to increase.

Since the performance of electronic components within the image pickup apparatus will be degraded at a high temperature, it is necessary to provide a cooling structure inside the image pickup apparatus. A heat dissipating structure that performs forced air-cooling inside an image pickup apparatus has been disclosed in Japanese Laid-Open Patent Publication (kokai) No. 2022-77037. The image pickup apparatus disclosed in Japanese Laid-Open Patent Publication (kokai) No. 2022-77037, which has a forced air-cooling flow path incorporated therein, passes outside air supplied from an intake port provided on a back surface of the image pickup apparatus through the forced air-cooling flow path, performs heat exchange, and then discharges the air from an exhaust port provided on a side surface of the image pickup apparatus to cool a main heat source inside the image pickup apparatus.

However, in Japanese Laid-Open Patent Publication (kokai) No. 2022-77037, cooling of a recording medium is not taken into consideration. If the image pickup apparatus is additionally provided with a structure for cooling the recording medium, the size of the image pickup apparatus will increase. As a writing bit rate increases due to higher image quality in the future, it is predicted that the amount of heat generated in the recording medium will further increase, so it will be necessary to efficiently cool the recording medium.

SUMMARY OF THE INVENTION

The present invention provides an image pickup apparatus capable of efficiently cooling a recording medium while preventing size increase.

Accordingly, the present invention provides an image pickup apparatus comprising a first board that is substantially perpendicular to an optical axis direction, a second board that is disposed substantially parallel to the first board, a recording medium housing that is mounted on the second board and is capable of housing a recording medium, a gripping portion that is gripped when the image pickup apparatus is in use, a battery housing that is arranged so as to overlap the gripping portion on projection when viewed from the optical axis direction and is capable of housing a battery, a first air-cooling duct that is disposed between the battery housing and the second board, and a fan that generates an air current within the first air-cooling duct. The first air-cooling duct is thermally connected to at least one of the recording medium, the recording medium housing, or the second board.

According to the present invention, it is possible for the image pickup apparatus to efficiently cool the recording medium while preventing size increase.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1A:
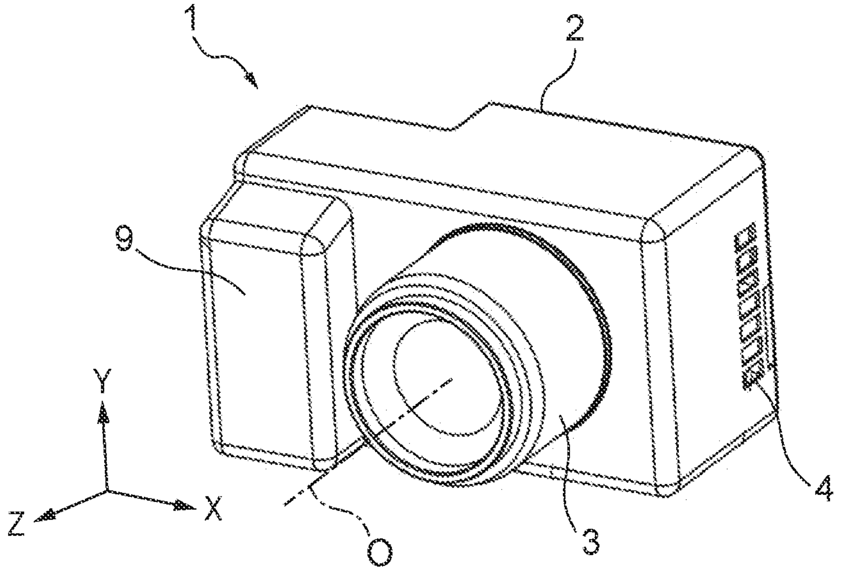
FIGS. 1A, 1B, and 1C are perspective views of an image pickup apparatus.
Figure 1B:
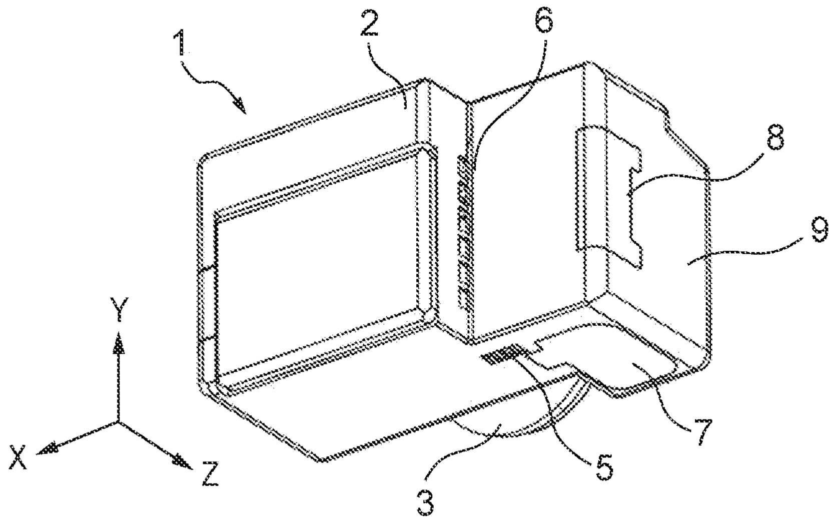
Figure 1C:
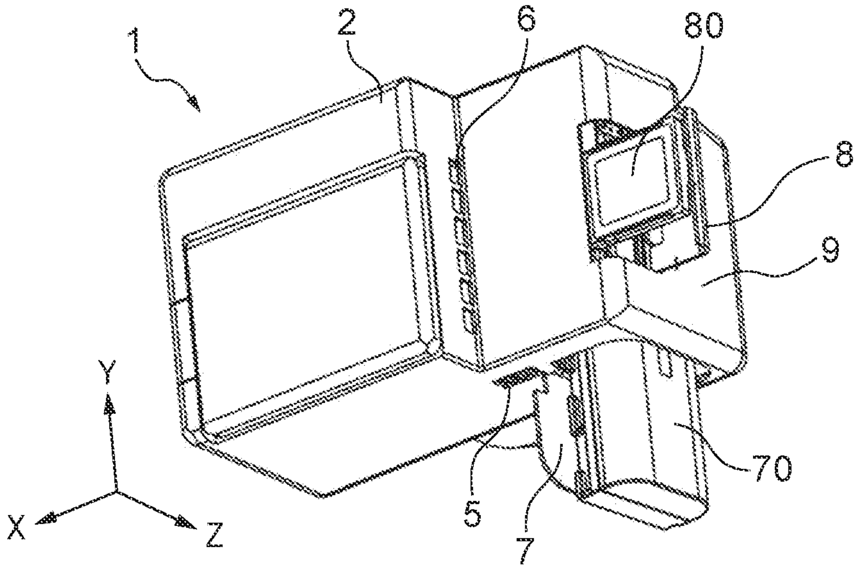

First, a first embodiment of the present invention will be described. FIGS. 1A, 1B, and 1C are perspective views of an image pickup apparatus 1 according to the first embodiment of the present invention. In order to simplify the following description, an XYZ coordinate system is defined below. A photographing optical axis direction (a direction of an optical axis O, hereinafter, also simply referred to as "an optical axis direction") of the image pickup apparatus 1 is defined as a Z axis, and a subject direction is defined as positive (+Z). On a plane perpendicular to the Z axis, a width direction (a left-and-right direction) of the image pickup apparatus 1 is defined as an X axis, and the right side when viewed from the subject side (+Z side) is defined as positive (+X). Furthermore, a top-and-bottom direction of the image pickup apparatus 1 is defined as a Y axis, and a direction towards the top is defined as positive (+Y).

Therefore, FIG. 1A is a front perspective view of the image pickup apparatus 1, and FIGS. 1B and 1C are rear perspective views of the image pickup apparatus 1. Furthermore, FIG. 1C shows a state in which a battery 70 and a recording medium 80 are being inserted into or removed from the image pickup apparatus 1.

The image pickup apparatus 1 includes an image pickup apparatus main body 2 and a lens 3. Components that connote (realize) main functions of the image pickup apparatus 1 such as a control circuit board 13 (see FIG. 2B), an image pickup device 101 (see FIG. 4B), a power supply unit, a recording unit for recording images, and various kinds of operating units are disposed inside the image pickup apparatus main body 2 (are disposed in the interior of the image pickup apparatus main body 2). As shown in FIG. 1A, the lens 3 is mounted on the photographing subject side (the +Z side) with respect to the image pickup apparatus main body 2. The lens 3 is interchangeable according to a photographing situation.

As shown in FIG. 1A, an exhaust port 4 is provided on the right side portion (+X side) of the image pickup apparatus main body 2. Air that has become hot inside the image pickup apparatus main body 2 is discharged from the exhaust port 4 by a forced air-cooling mechanism using a cooling fan 15 (see FIG. 3A and FIG. 3B), which will be described below. As shown in FIG. 1B and FIG. 1C, a first intake port 5 is provided on the bottom surface portion (−Y side) of the image pickup apparatus main body 2. Cold air is taken into inside the image pickup apparatus main body 2 from the first intake port 5 by the forced air-cooling mechanism using the cooling fan 15.

A second intake port 6 is provided at a position close to the left side of the image pickup apparatus main body 2. The cold air is taken into inside the image pickup apparatus main body 2 from the second intake port 6 by the forced air-cooling mechanism using the cooling fan 15. A gripping portion 9, which is a gripping portion for a photographer to grip the image pickup apparatus main body 2, is disposed on the left side portion of the image pickup apparatus main body 2. The gripping portion 9 has a shape that protrudes toward the front of the image pickup apparatus main body 2 (the +Z direction). Since the second intake port 6 is provided on a side surface portion that is stepped from the gripping portion 9, it is unlikely to be covered even in the case that the photographer grips the image pickup apparatus 1.

In addition, the image pickup apparatus main body 2 has a battery lid 7 that covers the battery 70. The battery 70 is capable of being inserted into and removed from the image pickup apparatus 1 in the top-and-bottom direction of the image pickup apparatus main body 2 (in a direction of the Y axis). In addition, a recording medium lid 8 that covers the recording medium 80 is provided on the left side portion of the image pickup apparatus main body 2. The recording medium 80 is capable of being inserted into and removed from the image pickup apparatus 1 in the left-and-right direction of the image pickup apparatus main body 2 (in a direction of the X axis), and is housed in a medium slot 202 (see FIG. 3A), which will be described below. The battery 70 and the recording medium 80 are each housed in the gripping portion 9.

Figure 2A:
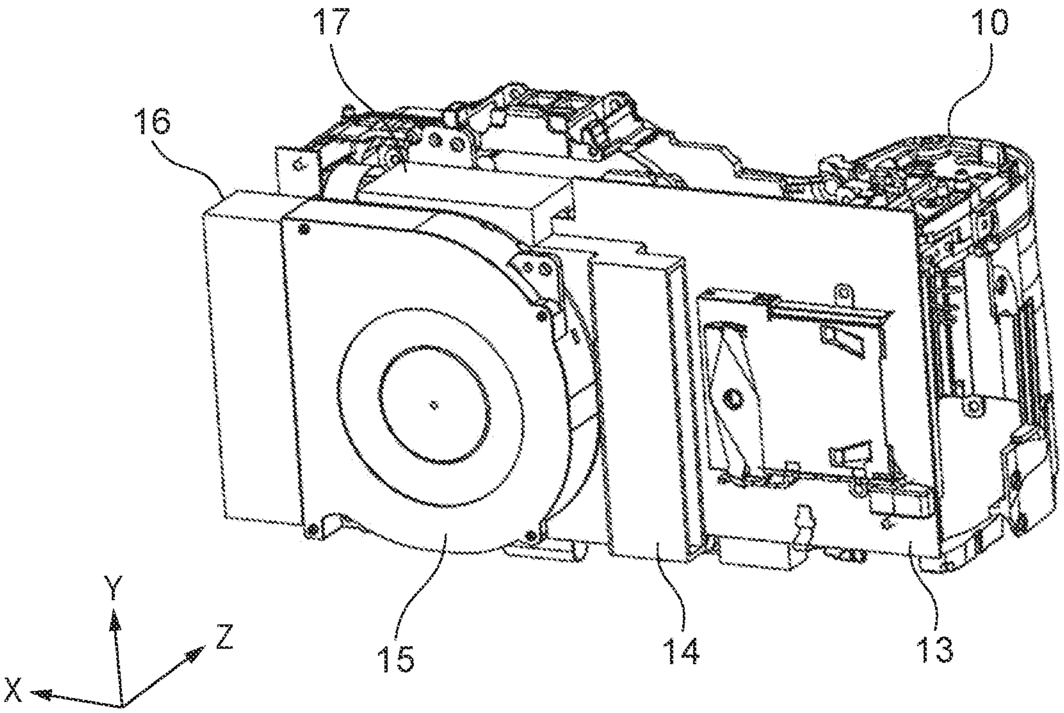
FIGS. 2A and 2B are a rear perspective view and a front perspective view, respectively, of internal components of the image pickup apparatus.
Figure 2B:
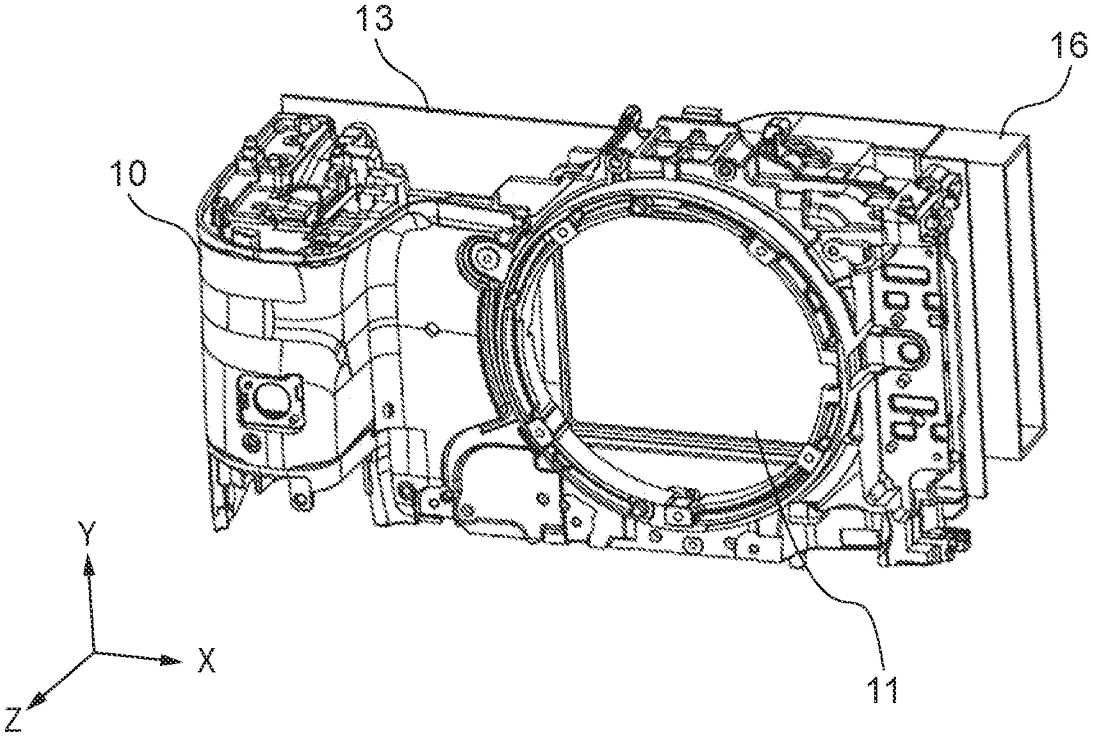
Figure 3A:
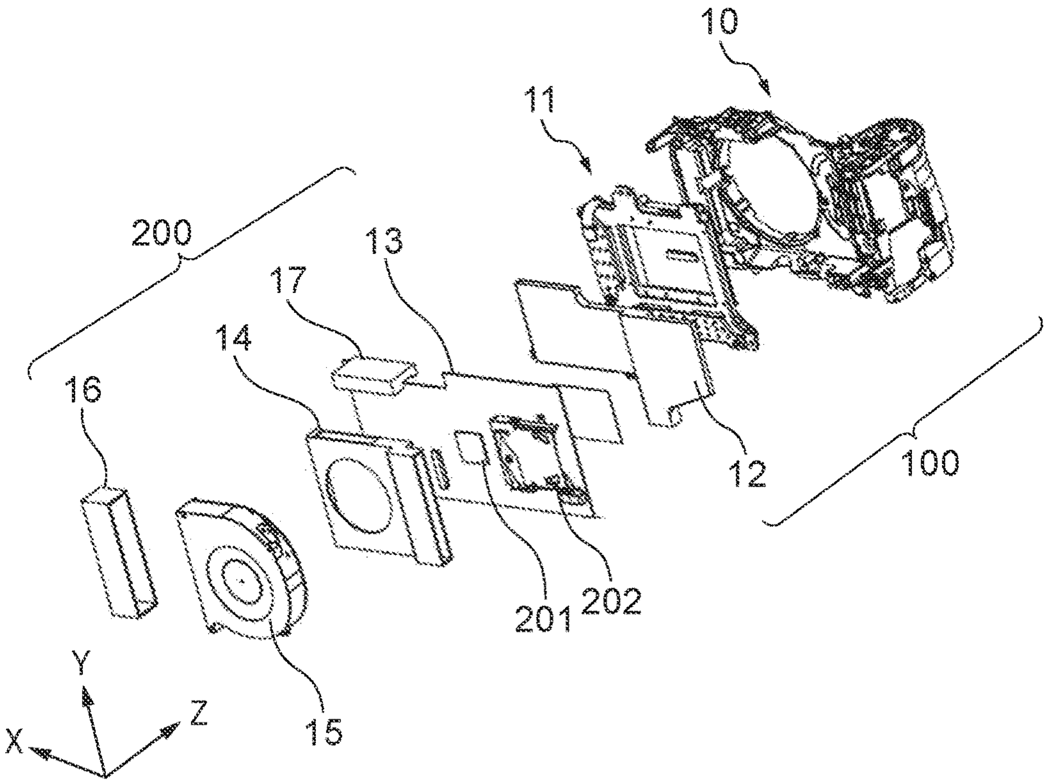
FIGS. 3A and 3B are a rear exploded perspective view and a front exploded perspective view, respectively, of the internal components of the image pickup apparatus.
Figure 3B:
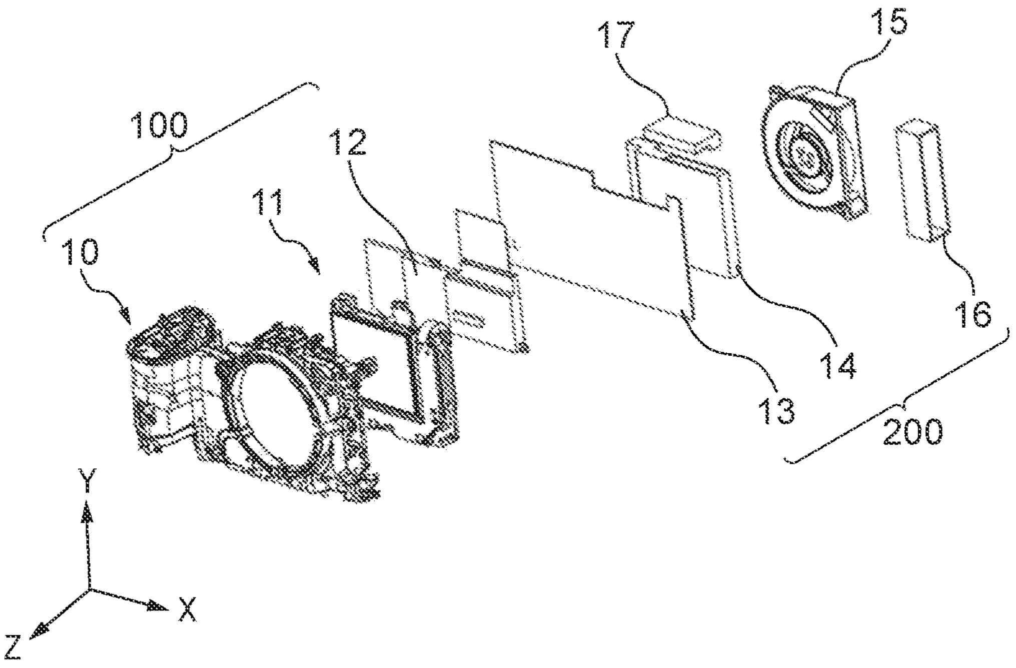

Internal components of the image pickup apparatus 1 will be described with reference to FIGS. 2A, 2B, 3A, and 3B. FIG. 2A and FIG. 2B are a rear perspective view and a front perspective view, respectively, of the internal components of the image pickup apparatus 1. FIG. 3A is a rear exploded perspective view of the internal components of the image pickup apparatus 1, and FIG. 3B is a front exploded perspective view of the internal components of the image pickup apparatus 1. It should be noted that the components other than the main components are not shown in FIG. 2A, FIG. 2B, FIG. 3A, and FIG. 3B.

As shown in FIG. 3A and FIG. 3B, the interior of the image pickup apparatus main body 2 mainly includes an image pickup unit 100 and a main unit 200. The image pickup unit 100 includes an image pickup unit holding member 10, an image pickup device unit 11, and a first air-cooling duct 12. The image pickup device unit 11 includes a drive unit (an image pickup device drive unit 110, which will be described below) that holds the image pickup device 101 (see FIG. 4B), and a holding unit (a fixing metal sheet 121, which will be described below, or the like) that holds the drive unit so that the drive unit is able to be operated (driven). This realizes an image stabilization function of the image pickup device 101. Details of an image stabilization structure in the image pickup unit 100 will be described below.

The main unit 200 includes the control circuit board 13, a second air-cooling duct 14, the cooling fan 15, an exhaust port connecting portion 16, and a duct connecting portion 17. The control circuit board 13 controls the entire image pickup apparatus 1.

The first air-cooling duct 12 is made of metal such as aluminum with high thermal conductivity, and is thermally connected to the image pickup device 101. Furthermore, the first air-cooling duct 12 is thermally connected to the recording medium 80 housed in the medium slot 202 mounted on the control circuit board 13. The second air-cooling duct 14 is made of metal such as aluminum with high thermal conductivity, and is thermally connected to an integrated circuit (an IC) 201, which is a main heat source on the control circuit board 13.

Heat generated in the image pickup device 101, the recording medium 80, and the IC 201 is dissipated by a heat dissipating structure. The cooling fan 15 rotates to generate an air current within the first air-cooling duct 12 (within a first air-cooling duct). The heat dissipating structure implements forced air-cooling by taking in air from the outside of the image pickup apparatus main body 2 by rotating the cooling fan 15, performing heat exchange with each air-cooling duct, and discharging the air that has become hot to the outside. Details of the heat dissipating structure will be described below.

Figure 4A:
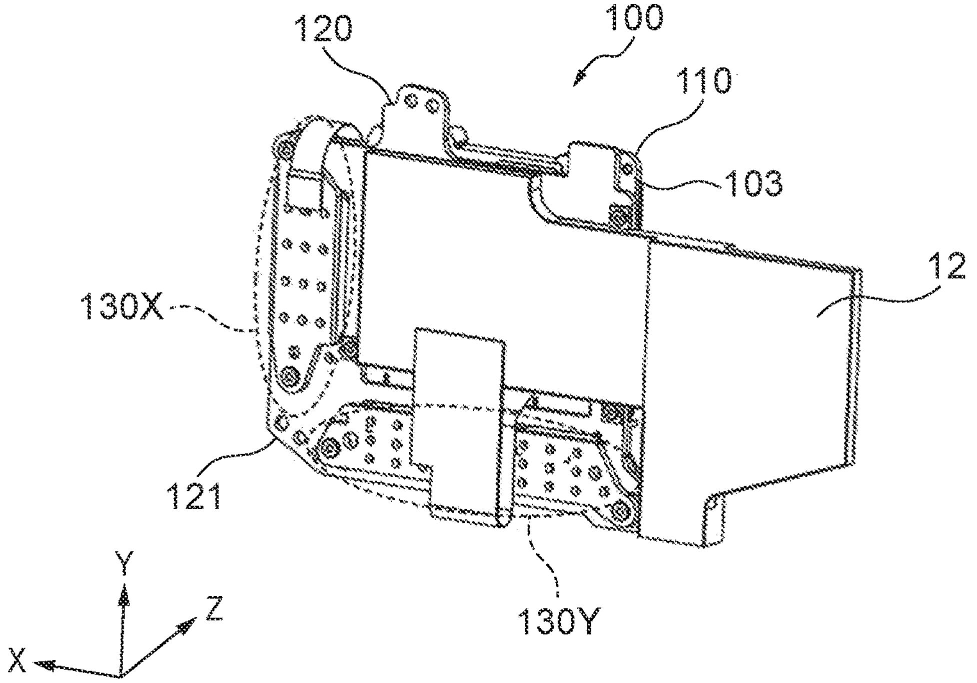
FIGS. 4A and 4B are a rear perspective view and a front perspective view, respectively, of an image pickup unit.
Figure 4B:
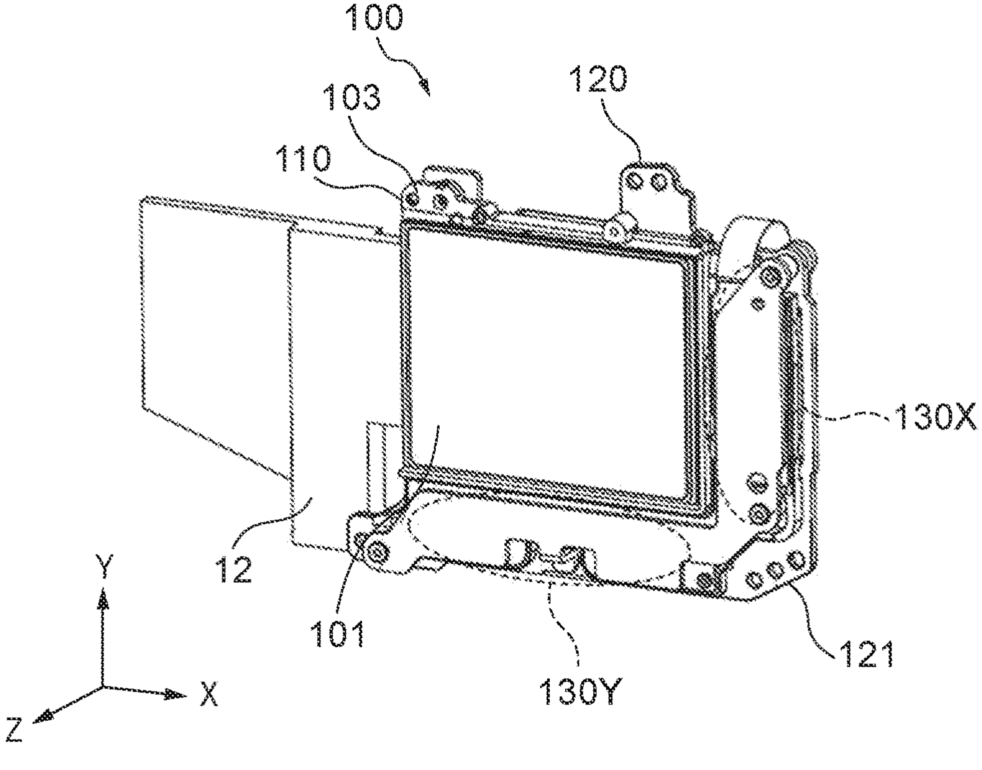

The image stabilization structure in the image pickup unit 100 will be described with reference to FIG. 4A and FIG. 4B. FIG. 4A and FIG. 4B are a rear perspective view and a front perspective view, respectively, of the image pickup unit 100. It should be noted that the image pickup unit holding member 10 is not shown in FIG. 4A and FIG. 4B.

The image pickup unit 100 includes the image pickup device drive unit 110 and an image pickup device holding unit 120. The image pickup device drive unit 110 includes the image pickup device 101, an image pickup device board 102 (see FIG. 6A) on which the image pickup device 101 is mounted, an image pickup device holding member 103 that adhesively holds the image pickup device 101, and so forth. The image pickup device holding unit 120 includes the fixing metal sheet 121, the first air-cooling duct 12, and so forth. The image pickup device 101 converts light entering from the lens 3 into electric signals.

The image pickup device drive unit 110 is sandwiched between constituent members of the image pickup device holding unit 120, and is rollably held by a ball member (not shown) or the like. A first drive mechanism 130X and a second drive mechanism 130Y are extended in the Y direction and the X direction, respectively, of the image pickup unit 100. Since the first drive mechanism 130X and the second drive mechanism 130Y each have coils, magnets, etc. (none of which are shown), which are arranged overlappingly in the optical axis direction, it is possible to generate a driving force by using a voice coil motor system.

These drive mechanisms (the first drive mechanism 130X and the second drive mechanism 130Y) allow the image pickup device drive unit 110 to be driven so as to move in a predetermined direction by a predetermined amount relatively to the image pickup device holding unit 120. For example, in the case that a camera shake occurs when the image pickup apparatus 1 is in use, by detecting the amount of the camera shake and driving the image pickup device drive unit 110 so as to offset (cancel) the amount of the camera shake, it is possible to correct (eliminate) blurring of photographed images caused by the camera shake.

The first air-cooling duct 12 has an image pickup device cooling surface 12*a* (see FIG. 6A) at a position opposed to the image pickup device unit 11, and the heat generated in the image pickup device unit 11 is transferred to the first air-cooling duct 12 through the image pickup device cooling surface 12*a*. The heat transferred to the first air-cooling duct 12 is cooled by the heat dissipating structure, which will be described below.

Figure 5A:
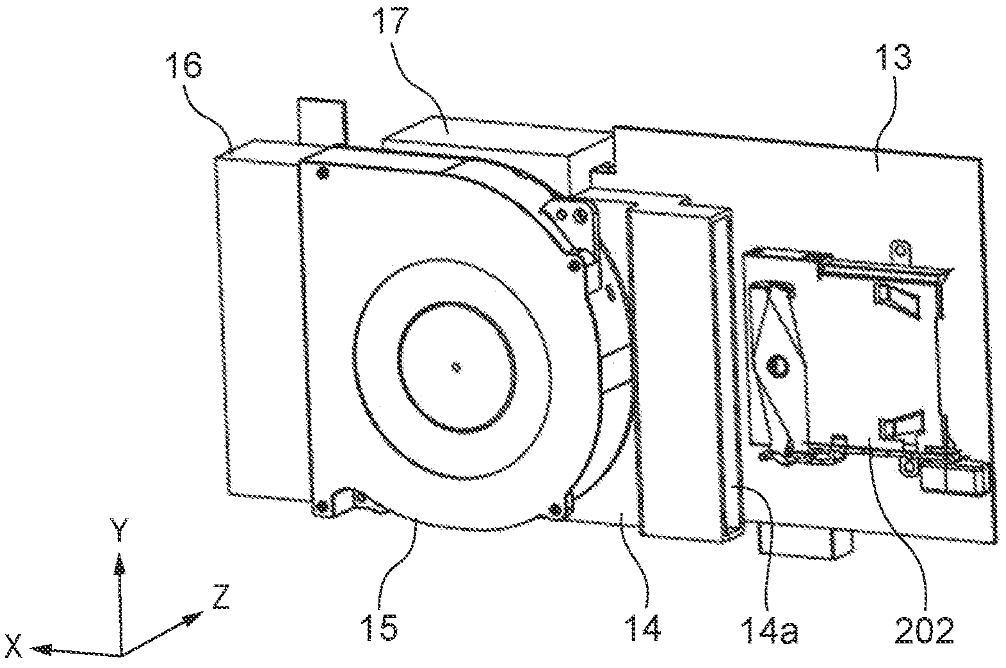
FIGS. 5A and 5B are a rear perspective view and a front perspective view, respectively, showing a heat dissipating structure of the image pickup apparatus.
Figure 5B:
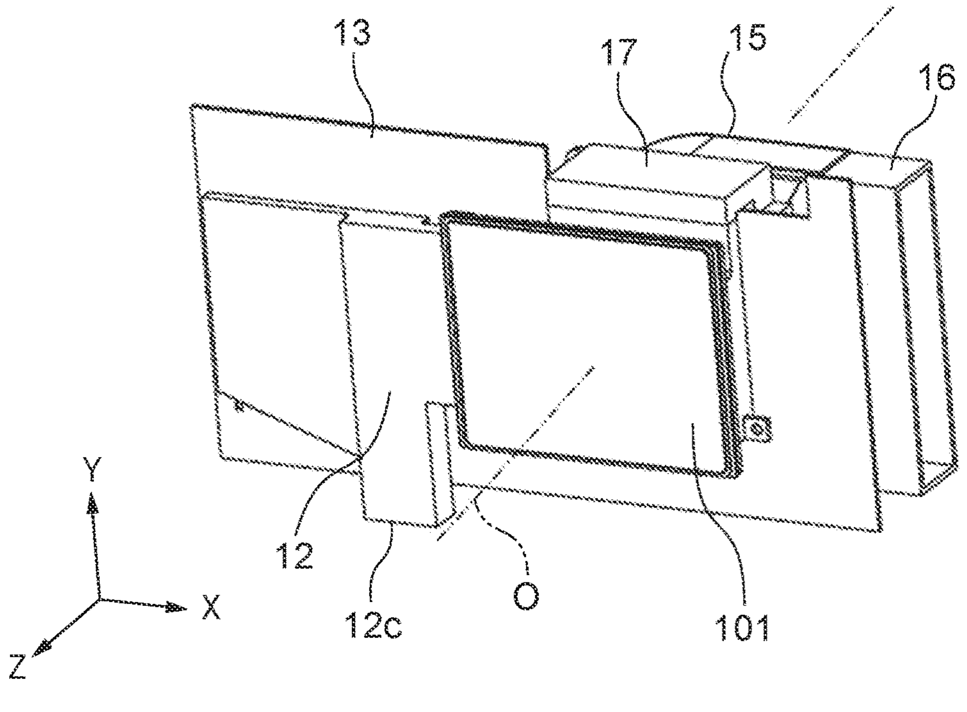

The heat dissipating structure in the image pickup apparatus 1 will be described with reference to FIG. 5A, FIG. 5B, FIG. 6A, and FIG. 6B. FIGS. 5A and 5B are internal perspective views showing the heat dissipating structure in the image pickup apparatus 1, FIG. 5A is a rear perspective view, and FIG. 5B is a front perspective view. Furthermore, FIGS. 6A and 6B are internal exploded perspective views showing the heat dissipating structure in the image pickup apparatus 1, FIG. 6A is a rear exploded perspective view, and FIG. 6B is a front exploded perspective view.

Figure 6A:
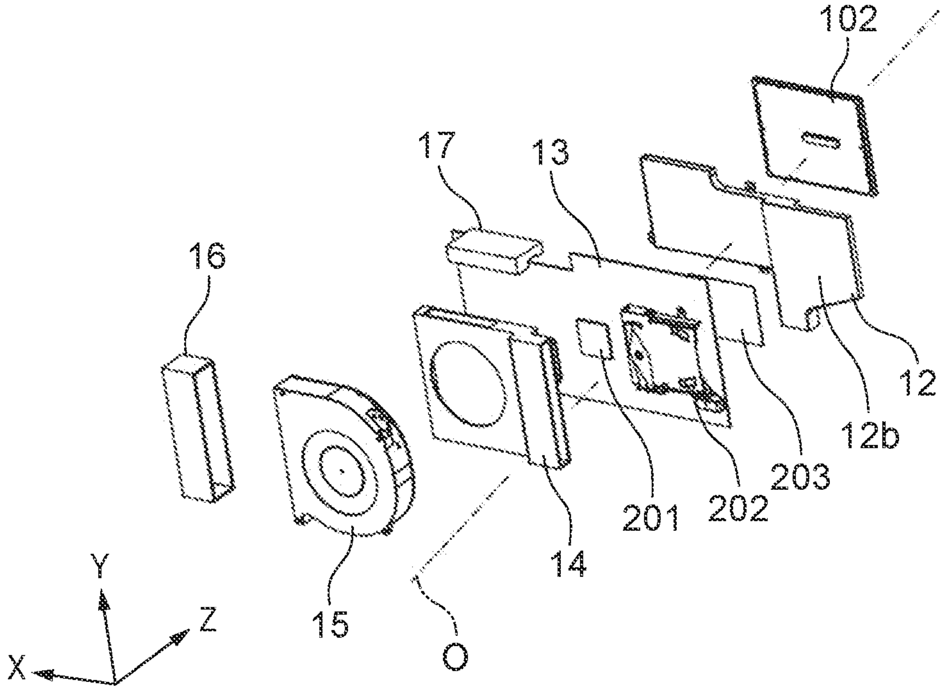
FIGS. 6A and 6B are a rear exploded perspective view and a front exploded perspective view, respectively, showing the heat dissipating structure of the image pickup apparatus.
Figure 6B:
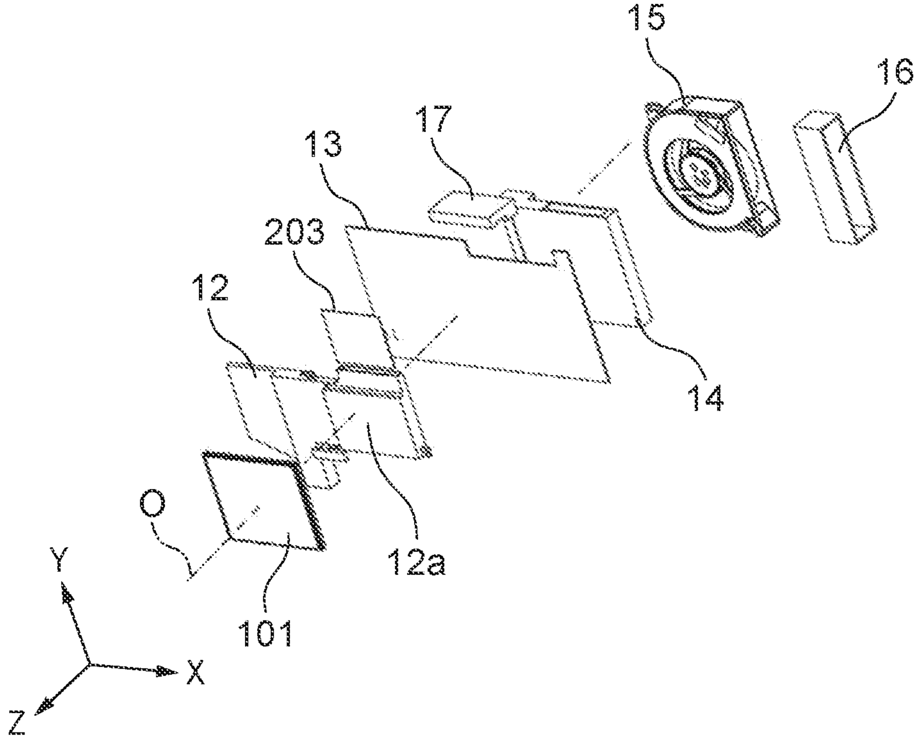

As shown in FIG. 5A, FIG. 5B, FIG. 6A, and FIG. 6B, the image pickup device 101 is mounted on the image pickup device board 102 (see FIG. 6A) so that the image pickup device 101 is substantially perpendicular to the optical axis direction. In addition, as shown in FIG. 6A and FIG. 6B, at the rear of the image pickup device 101, the first air-cooling duct 12 is disposed so as to be opposed to the image pickup device board 102.

The heat generated in the image pickup device 101 is transferred to the first air-cooling duct 12 from the image pickup device cooling surface 12*a*. This heat transfer is performed through, for example, a heat dissipating rubber (not shown), a graphite sheet (not shown), or the like, and does not significantly affect the image stabilization drive of the image pickup device unit 11.

The control circuit board 13 is disposed so as to be perpendicular to the optical axis O (see FIG. 3B). The image pickup device unit 11, the first air-cooling duct 12, and the control circuit board 13 are disposed in this order from the front. Video image signals or image signals output from the image pickup device board 102 are transmitted to the control circuit board 13 by a flexible printed circuit board (not shown), and are subjected to image processing performed by an image processing unit (not shown) on the control circuit board 13. The IC 201 responsible for the image processing and the like is thermally connected to the second air-cooling duct 14 disposed at the rear of the control circuit board 13 (behind the control circuit board 13).

The medium slot 202 is mounted near an end portion on the −X side of the control circuit board 13 (see FIG. 6A). The medium slot 202 is a housing unit capable of housing the recording medium 80. The position of the medium slot 202 is within a region that fits into the gripping portion 9 in terms of projection (on projection) when viewed from the rear, that is, the position of the medium slot 202 is within a projection region of the gripping portion 9 when viewed from the rear. The medium slot 202 is disposed on the rear side (−Z side) of the control circuit board 13.

When a moving image is recorded (photographed) by the image pickup apparatus 1, converted video image data is written into the recording medium 80 that has been inserted into the medium slot 202 (that has been loaded in the medium slot 202). Due to recent increase in the resolution of the video image data, the amount of heat generated by the recording medium 80 has increased with increase in the writing bit rate at which the video image data is written into the recording medium 80, and hence it is important to dissipate heat from the recording medium 80.

Both sides of the recording medium 80, which has been loaded in the medium slot 202, are covered by the control circuit board 13 and a portion of the medium slot 202. The first air-cooling duct 12 is disposed at the front of the control circuit board 13 (in the +Z direction). The first air-cooling duct 12 has a recording medium cooling surface 12*b* in a region that overlaps the medium slot 202 in terms of projection (on projection) when viewed from the rear (see FIG. 6A). The recording medium cooling surface 12*b* is thermally connected to the control circuit board 13 to which the recording medium cooling surface 12*b* is opposed, and hence the heat generated in the recording medium 80 is transferred to the first air-cooling duct 12 and is dissipated. In the first embodiment, a thermal conducting member 203 having elasticity is sandwiched between the control circuit board 13 and the first air-cooling duct 12, and the heat is transferred through the thermal conducting member 203.

According to the configuration in the first embodiment, the heat generated in the recording medium 80 is transferred from the control circuit board 13, to which the recording medium 80 is opposed, to the first air-cooling duct 12. In other words, the first air-cooling duct 12 is thermally connected to the control circuit board 13. However, the present invention is not limited to the configuration in the first embodiment, and may adopt a configuration in which the heat generated in the recording medium 80 is directly transferred from the recording medium 80, or may adopt a configuration in which the heat generated in the recording medium 80 is transferred from the medium slot 202. In addition, the medium slot 202 may be mounted on the front side of the control circuit board 13, that is, the mounting surface of the medium slot 202 may be the front side of the control circuit board 13. Therefore, the first air-cooling duct 12 has only to be thermally connected to at least one of the recording medium 80, the medium slot 202, and the control circuit board 13.

In addition, the second air-cooling duct 14 and the medium slot 202 do not overlap in terms of projection (on projection) when viewed from the rear, and are disposed in parallel in the left-and-right direction (see FIG. 5A and FIG. 5B). The second air-cooling duct 14 is not directly involved in the dissipation of the heat generated in the recording medium 80 (the heat dissipation of the recording medium 80), and is capable of dissipating the heat from the IC 201 near the medium slot 202 on the control circuit board 13, and as a result, it is possible to suppress an increase in the size of the gripping portion 9, especially an increase in the thickness of the gripping portion 9. The second air-cooling duct 14 has a second intake portion 14*a* (see FIG. 5A). In addition, the first air-cooling duct 12 has a first intake portion 12*c* (see FIG. 5B).

Next, a structure of forced air-cooling using the cooling fan 15 (the forced air-cooling mechanism using the cooling fan 15) will be described with reference to FIGS. 7A to 10.

Figure 7A:
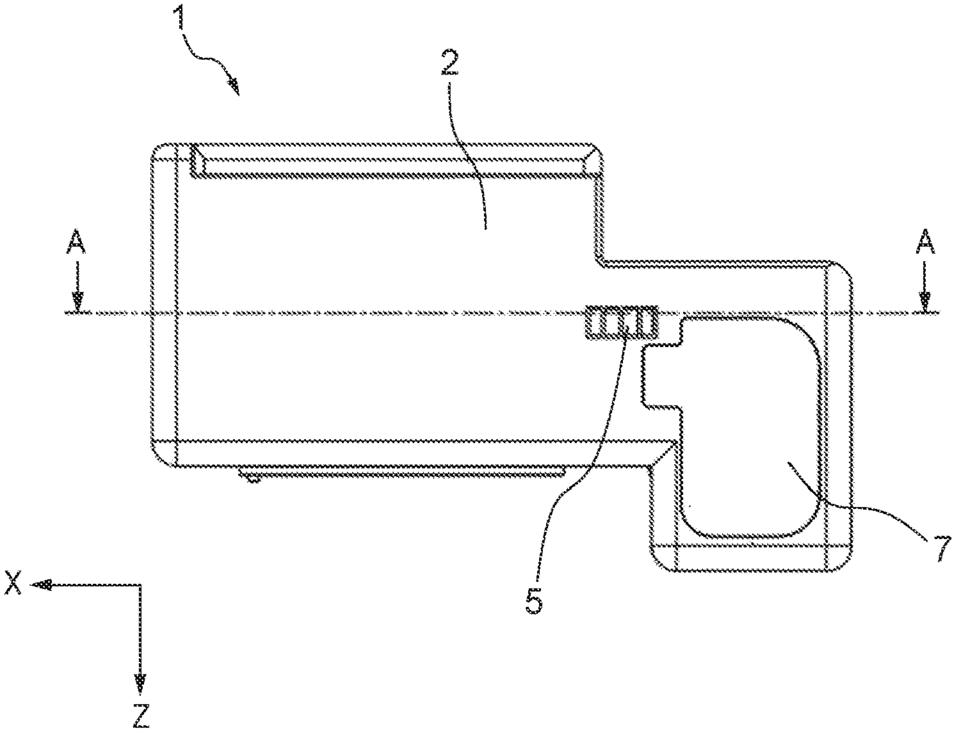
FIGS. 7A and 7B are a bottom view and a rear view, respectively, of the image pickup apparatus.
Figure 7B:
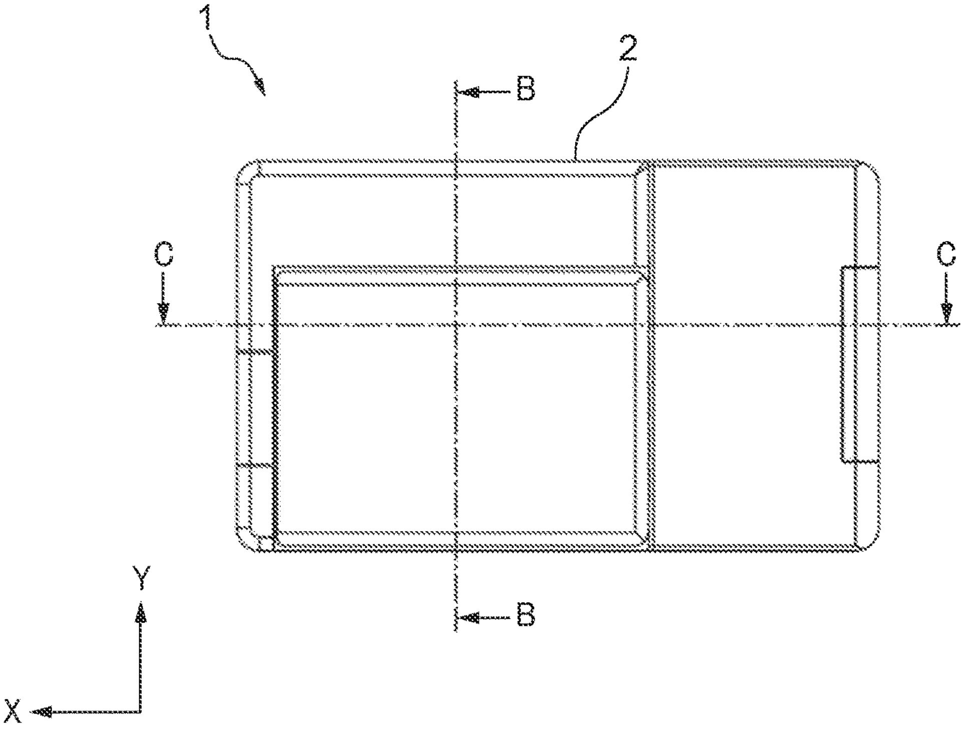
Figure 8:
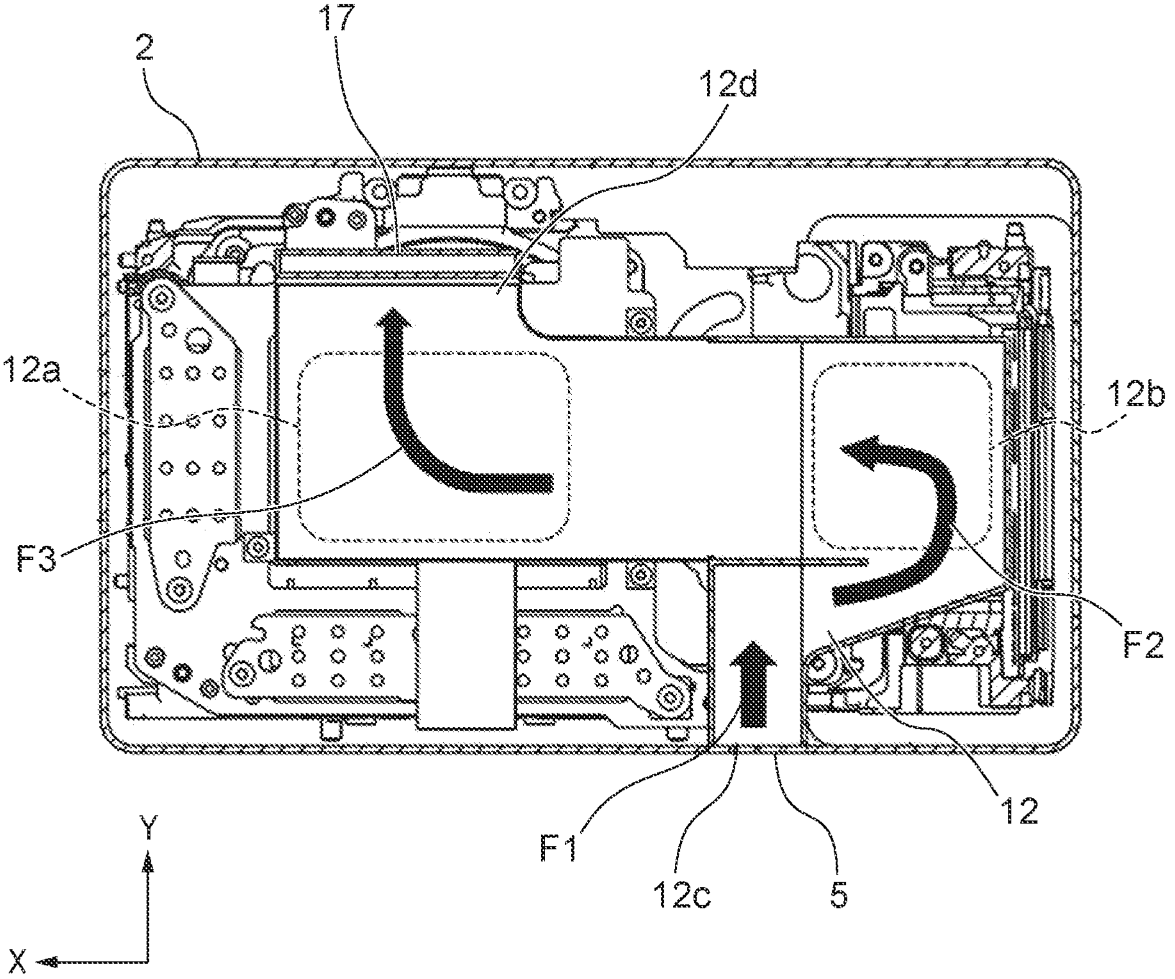
FIG. 8 is a cross-sectional view taken along line A-A in FIG. 7A.
Figure 9:
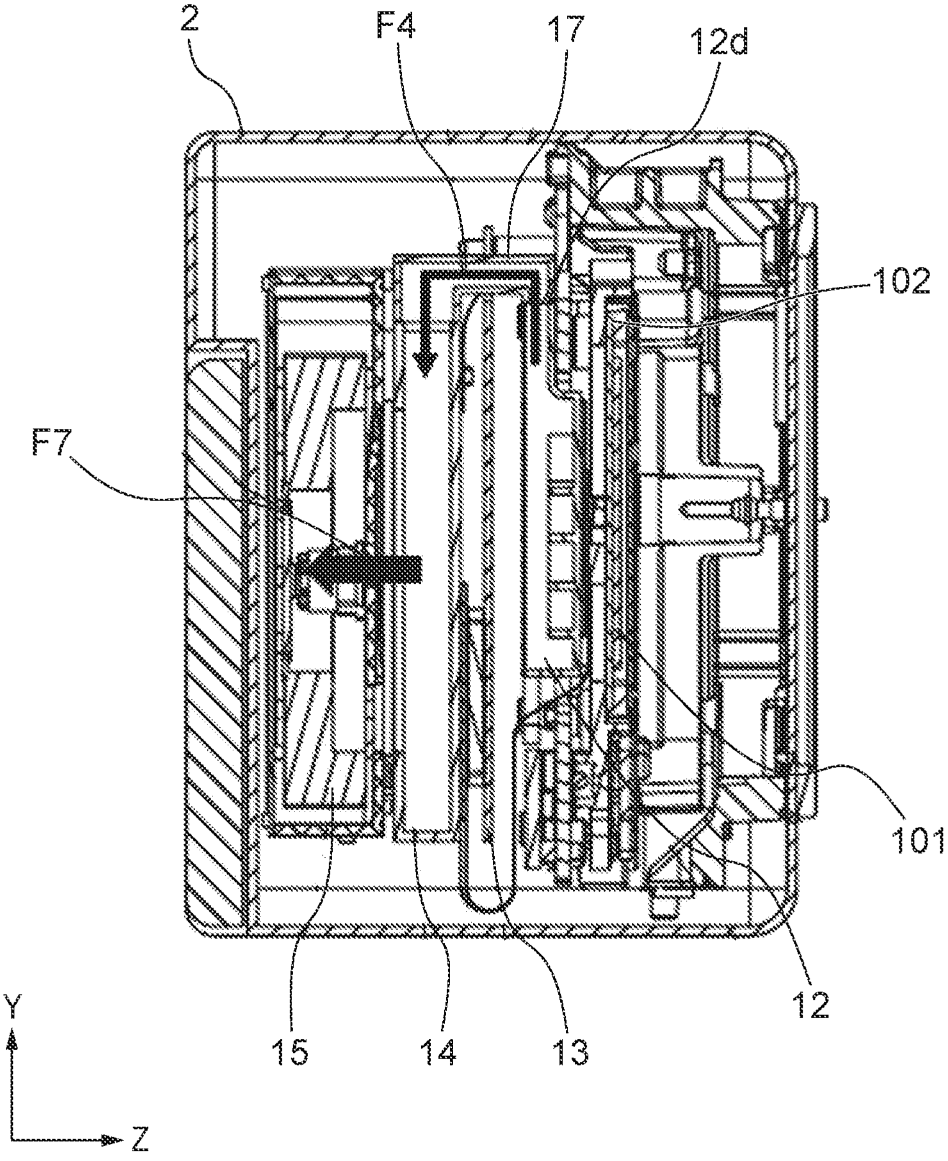
FIG. 9 is a cross-sectional view taken along line B-B in FIG. 7B.
Figure 10:
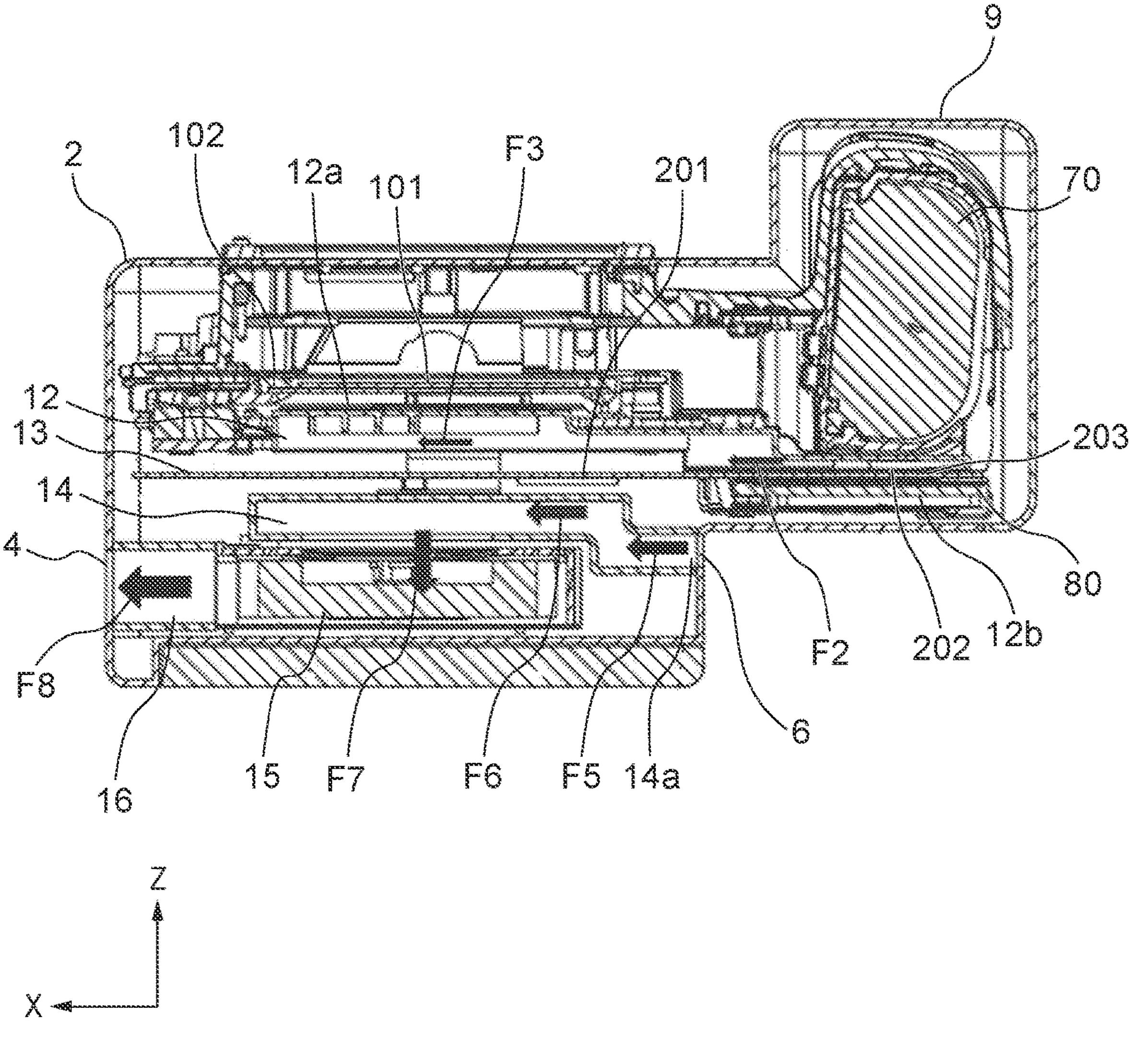
FIG. 10 is a cross-sectional view taken along line C-C in FIG. 7B.

FIGS. 7A and 7B are a bottom view and a rear view, respectively, of the image pickup apparatus 1. FIG. 8 is a cross-sectional view taken along line A-A in FIG. 7A. FIG. 9 is a cross-sectional view taken along line B-B in FIG. 7B. FIG. 10 is a cross-sectional view taken along line C-C in FIG. 7B.

As shown in FIG. 6A, FIG. 10, and the like, the control circuit board 13 is disposed substantially parallel to the image pickup device board 102 on the rear side (the −Z side; one side) of the image pickup device board 102 in the optical axis direction. The first air-cooling duct 12 is disposed on the rear side (the −Z side) in the optical axis direction than the image pickup device board 102 (a first board) and on the front side (the +Z side; the other side) in the optical axis direction than the control circuit board 13 (a second board) and the medium slot 202. In addition, the first air-cooling duct 12 is located between the image pickup device board 102 and the control circuit board 13 in the optical axis direction.

Furthermore, the battery 70 is housed in a region that overlaps the gripping portion 9 in terms of projection (on projection) when viewed from the optical axis direction, and the first air-cooling duct 12 is located between the battery 70 and the control circuit board 13 in the optical axis direction (see FIG. 10).

As shown in FIG. 7A and FIG. 8, the first intake port 5 located on the bottom surface of the image pickup apparatus main body 2 is connected to the first intake portion 12*c* of the first air-cooling duct 12. The rotation of the cooling fan 15 causes the air from the outside of the image pickup apparatus main body 2 to be taken into the first air-cooling duct 12 through the first intake port 5 and the first intake portion 12*c* (see an arrow F1 shown in FIG. 8). The heat generated in the recording medium 80 housed in the medium slot 202 is transferred to the recording medium cooling surface 12*b* of the first air-cooling duct 12, which is located at the front of the control circuit board 13, via the thermal conducting member 203 (see an arrow F2 shown in FIG. 8 and FIG. 10).

On the other hand, the heat generated in the image pickup device 101 is transferred to the image pickup device cooling surface 12*a* of the first air-cooling duct 12 via a thermal conducting member (not shown) or the like (see an arrow F3 shown in FIG. 8 and FIG. 10). The air within the first air-cooling duct 12, which has become hot due to heat exchange with those heat sources (the recording medium 80 and the image pickup device 101), is taken into the second air-cooling duct 14 via the duct connecting portion 17, which is connected to a first exhaust portion 12*d* of the first air-cooling duct 12 (see an arrow F4 shown in FIG. 9).

The second intake port 6 of the image pickup apparatus main body 2 is connected to the second intake portion 14*a* of the second air-cooling duct 14. The rotation of the cooling fan 15 causes the air from the outside of the image pickup apparatus main body 2 to be taken into the second air-cooling duct 14 through the second intake port 6 and the second intake portion 14*a* (see an arrow F5 shown in FIG. 10). The heat generated in the IC 201 mounted on the control circuit board 13 is transferred to the second air-cooling duct 14, which is located at the rear of the control circuit board 13, via a thermal conducting member (not shown) or the like (see an arrow F6 shown in FIG. 10).

The air within the second air-cooling duct 14, which has become hot due to heat exchange with this heat source (the IC 201), merges with the air, which has become hot as the heat generated in the image pickup device 101 and the recording medium 80 is transferred from the first air-cooling duct 12, and then is taken into the cooling fan 15 (see an arrow F7 shown in FIG. 9 and FIG. 10). Then, the air, which has been taken into the cooling fan 15, is discharged to the outside from the exhaust port 4 of the image pickup apparatus main body 2 through the exhaust port connecting portion 16 (see an arrow F8 shown in FIG. 10).

As described above, with the forced air-cooling mechanism using the cooling fan 15, it becomes possible to discharge the heat generated in the recording medium 80 to the outside of the image pickup apparatus main body 2 via the first air-cooling duct 12. Therefore, even when recording at a high bit rate, the reliability of the image pickup apparatus 1 can be improved without stopping recording. Moreover, the heat generated in the image pickup device 101 and the control circuit board 13, which are other heat sources, can also be discharged to the outside of the image pickup apparatus main body 2 via the first air-cooling duct 12 and the second air-cooling duct 14, and as a result, the reliability of the image pickup apparatus 1 can be further improved.

According to the first embodiment, the first air-cooling duct 12 is disposed on the rear side in the optical axis direction than the image pickup device board 102 and on the front side in the optical axis direction than the control circuit board 13 and the medium slot 202 (see FIG. 10). The first air-cooling duct 12 is thermally connected to the control circuit board 13. In addition, since the heat generated in the control circuit board 13 is discharged via the first air-cooling duct 12 by the forced air-cooling mechanism using the cooling fan 15, the recording medium 80 housed in the medium slot 202 is efficiently cooled. Moreover, since the forced air-cooling mechanism using the cooling fan 15 cools the control circuit board 13 and there is no need to provide a new cooling structure for cooling the recording medium 80, complicating the configuration and increasing the size of the image pickup apparatus 1 can be avoided. Therefore, it is possible to efficiently cool the recording medium 80 while suppressing the increase in the size of the image pickup apparatus 1.

Furthermore, since the image pickup device 101 is thermally connected to the first air-cooling duct 12, it is possible to efficiently cool the image pickup device 101.

Moreover, since the second air-cooling duct 14 is thermally connected to the IC 201, which is the main heat source on the control circuit board 13, it is possible to efficiently cool the control circuit board 13 including the IC 201.

In addition, since air flow paths are communicated with each other by the duct connecting portion 17 connecting the first air-cooling duct 12 and the second air-cooling duct 14, it is possible to efficiently discharge the air, which has been taken into the first air-cooling duct 12, via the second air-cooling duct 14.

Next, a second embodiment of the present invention and a modification thereof will be described with reference to FIGS. 11 to 16. In an image pickup apparatus 1 according to the second embodiment, the configurations of a first air-cooling duct 1000 and a medium slot 1020 are different from the configurations of the first air-cooling duct 12 and the medium slot 202 in the first embodiment.

Figure 11:
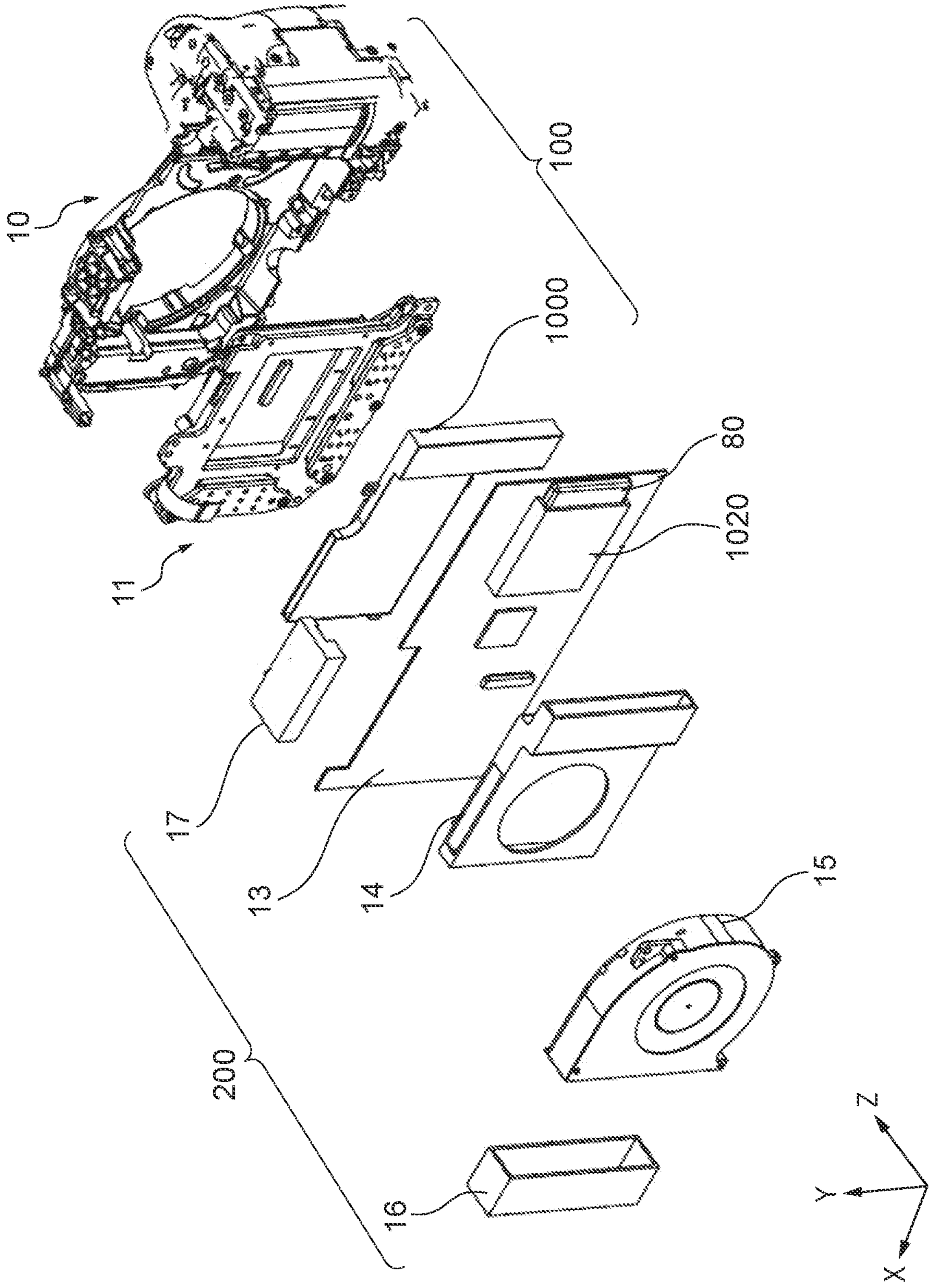
FIG. 11 is a rear exploded perspective view of the internal components of the image pickup apparatus.
Figure 12:
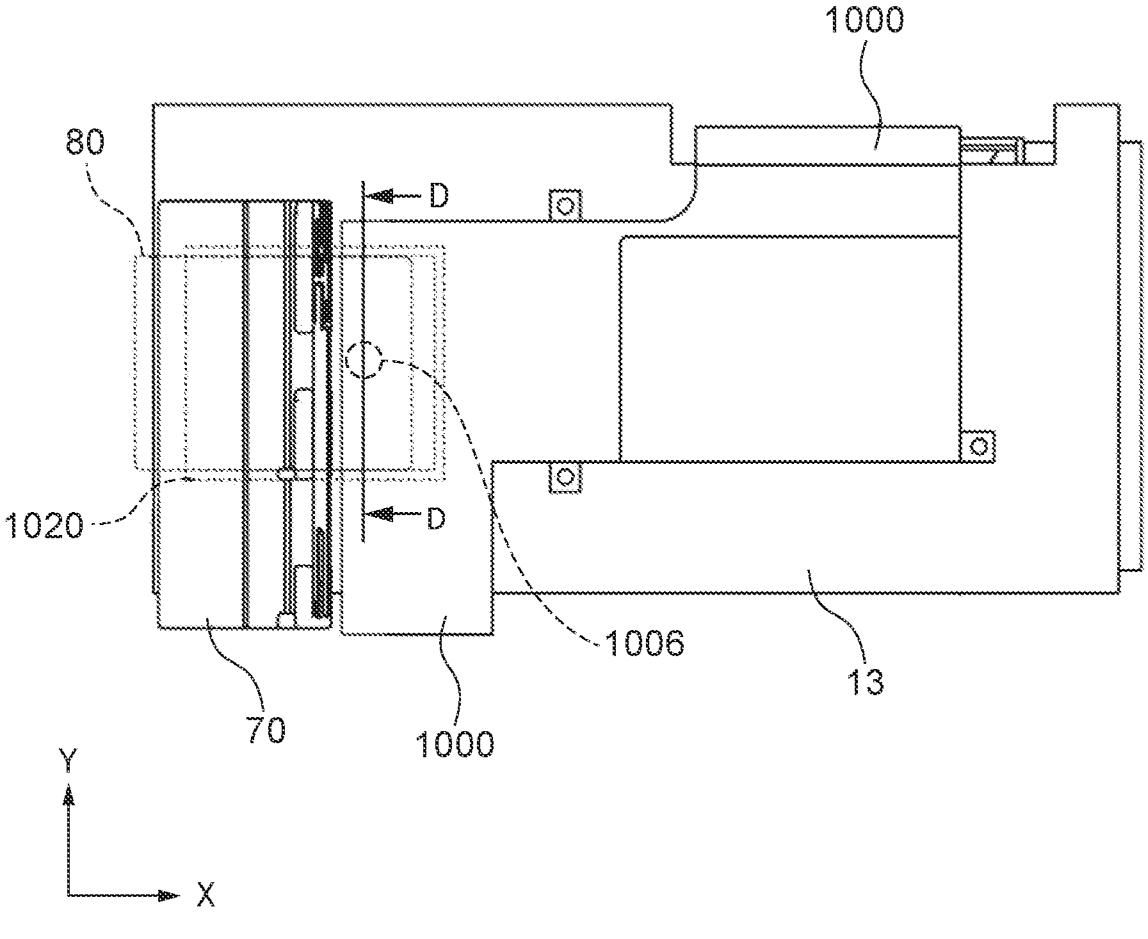
FIG. 12 is a front view that shows an internal configuration of the image pickup apparatus.

FIG. 11 is a rear exploded perspective view of internal components of the image pickup apparatus 1 according to the second embodiment. FIG. 12 is a front view that shows an internal configuration of the image pickup apparatus 1 according to the second embodiment. In FIG. 12, in order to explain the layout of the first air-cooling duct 1000, attention is mainly focused on the relationship between the first air-cooling duct 1000, the control circuit board 13, and the battery 70.

As shown in FIG. 12, the first air-cooling duct 1000 is disposed at a position that overlaps a portion of the recording medium 80 and does not overlap the battery 70 when viewed from the optical axis direction. In a region where the first air-cooling duct 1000 and the recording medium 80 overlap each other, there are heat transfer members (a spring 1006 and a receiving component 1007, which will be described below with reference to FIG. 16) that connect the recording medium 80 and the first air-cooling duct 1000. By these heat transfer members, it is possible to transfer the heat generated in the recording medium 80 to the first air cooling duct 1000. The heat transfer from the recording medium 80 to the first air-cooling duct 1000 will be described below.

Since the first air-cooling duct 1000 and the battery 70 do not overlap each other when viewed from the optical axis direction, it is possible to cool the recording medium 80 without increasing the thickness of the gripping portion 9. Therefore, it is possible to provide an image pickup apparatus that is compact and does not impair gripping performance.

Figure 13:
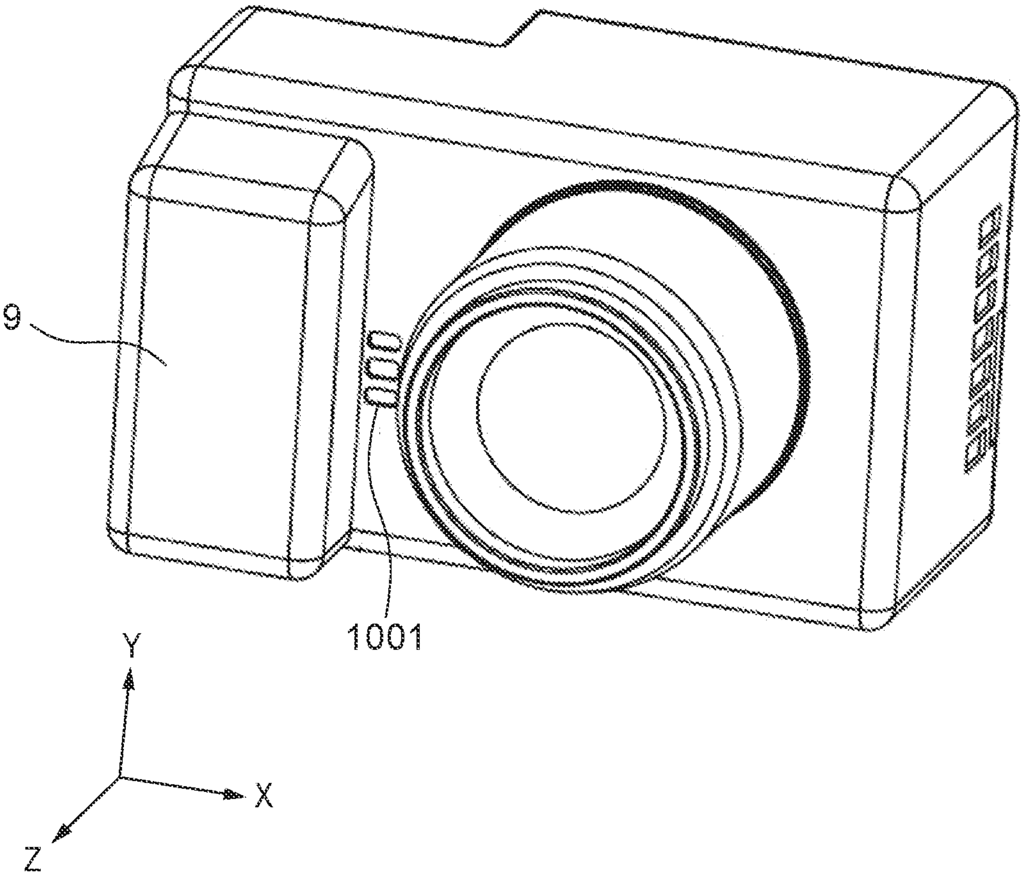
FIG. 13 is an external perspective view of the image pickup apparatus.
Figure 14:
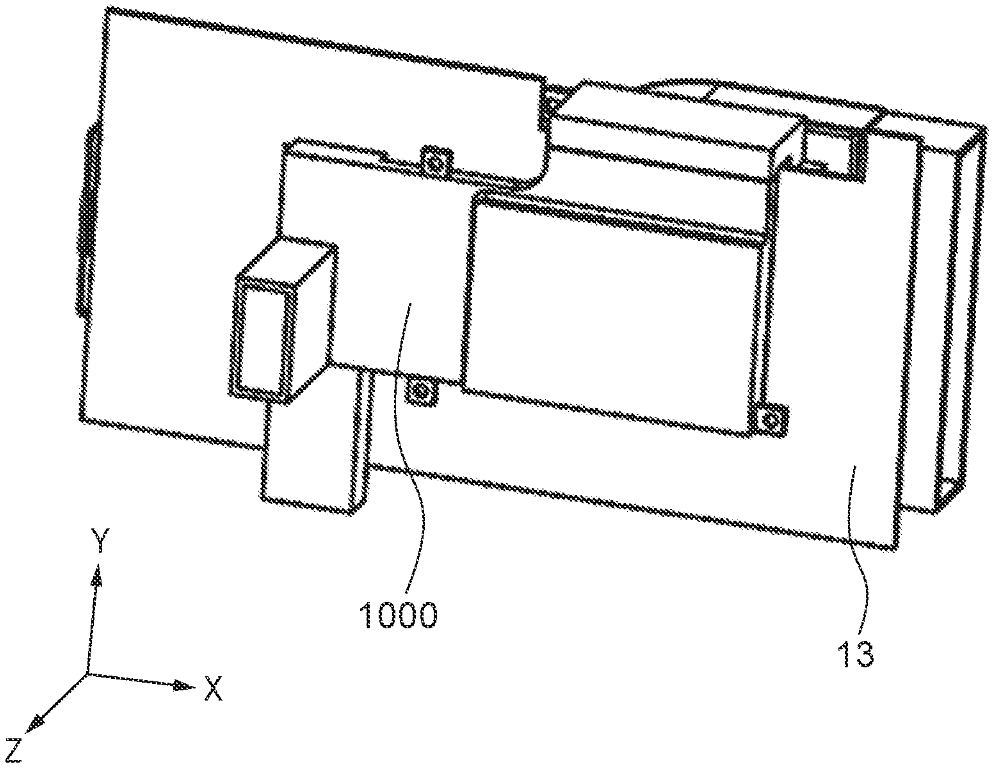
FIG. 14 is a front perspective view that shows the internal configuration of the image pickup apparatus.
Figure 15:
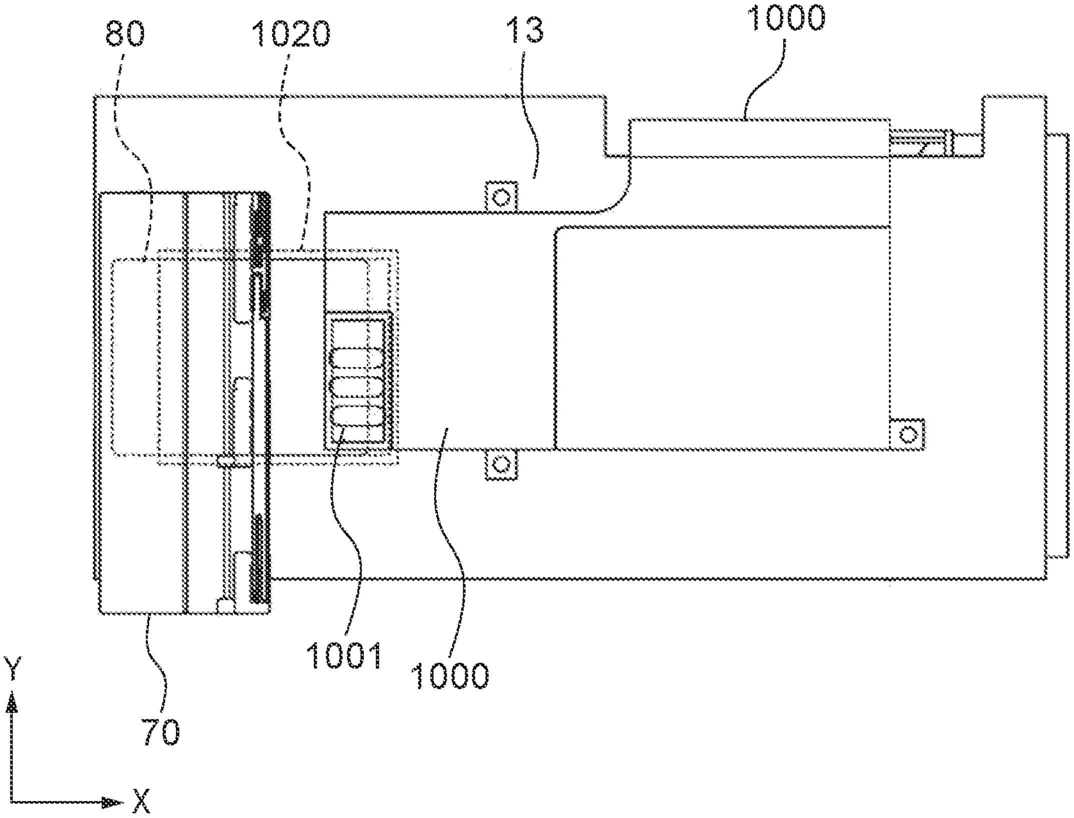
FIG. 15 is a front view that shows the internal configuration of the image pickup apparatus.

FIGS. 13 to 15 are views that explain the modification of the second embodiment. Since the heat dissipating structure in the second embodiment is the same as the heat dissipating structure in the modification of the second embodiment, first, the heat dissipating structure in the second embodiment will be described with reference to FIG. 16.

Figure 16:
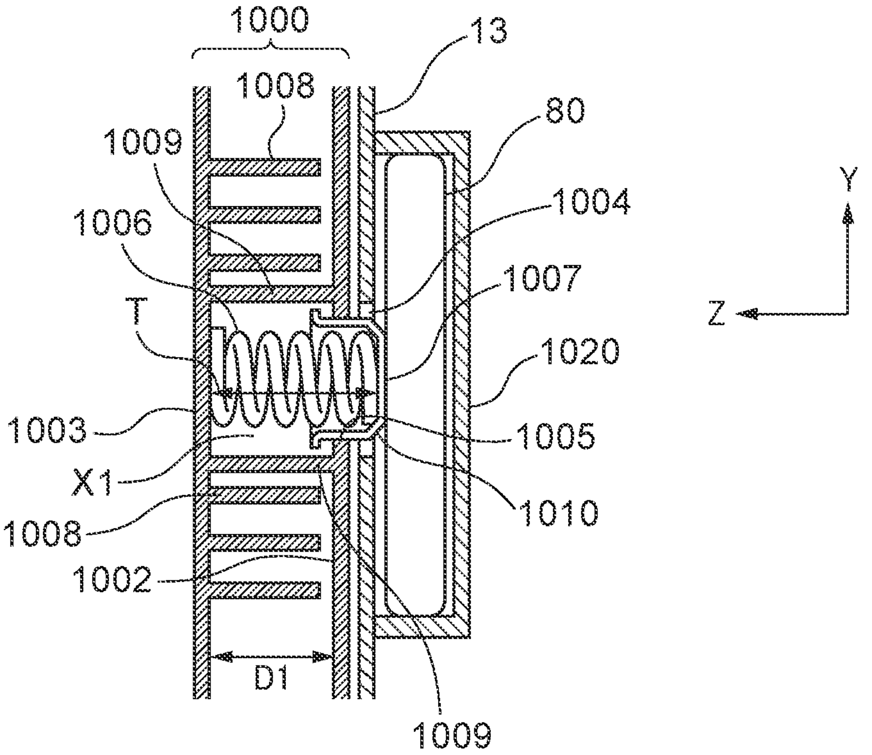
FIG. 16 is a cross-sectional view taken along line D-D in FIG. 12.

FIG. 16 is a cross-sectional view taken along line D-D in FIG. 12. An example of the heat transfer from the recording medium 80 to the first air-cooling duct 1000 will be described.

The first air-cooling duct 1000 has two walls that are substantially parallel to the control circuit board 13. One wall of the two walls that is close to (adjacent to) the control circuit board 13 is referred to as a first wall 1002, and the other wall of the two walls that is away from the control circuit board 13 is referred to as a second wall 1003. The air flows between these two walls (the first wall 1002 and the second wall 1003).

A board hole 1004 for performing heat dissipating is formed in the control circuit board 13, and a duct hole 1005 is formed in the first wall 1002. Fins 1008 extend inward from the second wall 1003. The spring 1006 is provided between the second wall 1003 of the first air-cooling duct 1000 and the recording medium 80, passing through the board hole 1004 and the duct hole 1005.

The receiving component 1007 is provided between the spring 1006 and the recording medium 80. The receiving component 1007 is an abutment member that is pressed against the recording medium 80 by a biasing force of the spring 1006 and abuts on the recording medium 80. Therefore, a deformable range T of the spring 1006 is longer than a distance D1 between the first wall 1002 and the second wall 1003.

Since the receiving component 1007 is made of a material with high thermal conductivity such as metal and the spring 1006 is also made of metal, it is easy for the receiving component 1007 and the spring 1006 to transfer the heat. Therefore, the heat, which has been transferred to the receiving component 1007 after contacting the recording medium 80, is efficiently transferred to the second wall 1003 via the spring 1006. The heat transferred to the second wall 1003 is transferred to the fins 1008, is subjected to heat exchange with the air hitting the fins 1008, and is discharged to the outside, thereby it can be dissipated.

A slope 1010 is formed around the entire circumference of an edge portion of an end surface of the receiving component 1007, which contacts the recording medium 80. When the recording medium 80 is inserted, an end portion of the recording medium 80 hits the slope 1010 of the receiving component 1007. The spring 1006 is compressed by a force of the end portion of the recording medium 80 hitting the slope 1010 of the receiving component 1007, so that the recording medium 80 can be inserted smoothly.

In addition, the control circuit board 13 has a cylindrical wall 1009 that connects the first wall 1002 and the second wall 1003 so as to surround the outer periphery of the spring 1006. A portion of the first air-cooling duct 1000 is blocked (closed) by the cylindrical wall 1009. This blocked (closed) area is referred to as X1. The spring 1006 expands and contracts within the area X1. The air flows between the first wall 1002 and the second wall 1003 while avoiding the area X1, and hence the air never flows through the area X1.

Therefore, the air flowing through (within) the first air-cooling duct 1000 does not enter the spring 1006 and the recording medium 80.

As described above, since the spring 1006 is disposed between the second wall 1003 and the recording medium 80, it is possible to increase the deformable range T of the spring 1006. Therefore, the spring 1006 is able to expand and contract over a large stroke, and is able to abut on the recording medium 80 with a small load. In general, it is not preferable to add an external force to the recording medium 80 because the external force will be applied to contacts of the medium slot 202. However, by increasing the stroke of the spring 1006 as in the second embodiment, the load on the recording medium 80 is reduced, and as a result, it is possible to maintain an appropriate contact state.

In addition, since the air does not flow through the spring 1006, which is disposed in the area X1 isolated by the cylindrical wall 1009, and the recording medium 80, dust carried from the outside air flowing within the first air-cooling duct 1000 never accumulates. Therefore, it is possible to avoid obstructing the elasticity of the spring 1006 and to prevent the dust from entering the medium slot 1020. It should be noted that although the spring 1006 is used as a biasing member that biases the recording medium 80, the form of the spring is not limited to this. Further, other elastic members may be used as long as they have the elasticity and good thermal conductivity.

According to the second embodiment, the first air-cooling duct 1000 is disposed on the rear side in the optical axis direction than the image pickup device board 102 and on the front side in the optical axis direction than the control circuit board 13 and the medium slot 1020. The first air-cooling duct 1000 is thermally connected to the control circuit board 13. Therefore, according to the second embodiment, the same effects as those in the first embodiment can be achieved in terms of efficiently cooling the recording medium 80 while suppressing the increase in the size of the image pickup apparatus 1.

Moreover, at least a portion of the medium slot 1020 and the battery 70 overlap when viewed from the optical axis direction. The first air-cooling duct 1000 is disposed at a position that does not overlap the battery 70 and overlaps the medium slot 1020 when viewed from the optical axis direction (see FIG. 12). As a result, it is possible to enhance the cooling effect of the medium slot 1020 while suppressing expansion in the optical axis direction in the area where the battery 70 is disposed.

In addition, the spring 1006, which is a deformable heat transfer member, passes through the first wall 1002 of the first air-cooling duct 1000 and the control circuit board 13, and abuts on both the recording medium 80 and the second wall 1003 (see FIG. 16). As a result, it is possible to efficiently transfer the heat generated in the recording medium 80 to the first air-cooling duct 1000.

In addition, since the deformable range T of the spring 1006 is longer than the distance D1 between the first wall 1002 and the second wall 1003, it is possible to reduce the abutment load on the recording medium 80, and it is possible to maintain the appropriate contact state.

In addition, the spring 1006 is housed within the area X1 surrounded by the first wall 1002, the second wall 1003, and the cylindrical wall 1009 that is a third wall. As a result, it is possible to prevent the dust from entering the medium slot 1020.

Moreover, the receiving component 1007 is provided at a tip end of the spring 1006, the spring 1006 abuts on the recording medium 80 via the receiving component 1007, and the slope 1010 is provided at an end portion of the receiving component 1007. As a result, it is possible to smoothly perform an insertion operation of the recording medium 80.

Next, the modification of the second embodiment will be described with reference to FIGS. 13 to 15.

FIG. 13 is an external perspective view of an image pickup apparatus 1 according to the modification of the second embodiment. FIG. 14 and FIG. 15 are a front perspective view and a front view, respectively, showing an internal configuration of the image pickup apparatus 1 according to the modification of the second embodiment. In FIG. 14, in order to explain the duct structure, illustration of some components is omitted. Those which are not specifically mentioned are the same as those described in the second embodiment.

In the modification of the second embodiment, as shown in FIG. 13 and FIG. 15, an intake port 1001 is located on substantially the same surface as the surface of a mount to which the lens is attached, and is disposed between the mount and the gripping portion in the direction of the X axis. The air entering from the intake port 1001 flows into the first air-cooling duct 1000.

In addition, the intake port 1001 is disposed at a position that overlaps a portion of the recording medium 80 and does not overlap the battery 70 when viewed from the optical axis direction (see FIG. 15). As a result, the air can be taken in from a position close to the recording medium 80, which is the heat source. Therefore, the air immediately after taking in the outside air can be flowed near the recording medium 80, thereby increasing the cooling effect.

According to the modification of the second embodiment, since the first air-cooling duct 1000 takes in the air through the intake port 1001 disposed at the position that overlaps the medium slot 1020 when viewed from the optical axis direction, it is possible to further enhance the cooling effect of the recording medium 80.

It should be noted that in the second embodiment and the modification thereof, the first air-cooling duct 1000 has only to be thermally connected to at least one of the recording medium 80, the medium slot 1020, and the control circuit board 13. For example, the medium slot 1020 may be mounted on the front side of the control circuit board 13.

Moreover, the configuration is not limited to one in which the heat is dissipated directly from the recording medium 80 to the first air-cooling duct 1000, for example, a configuration in which the heat transferred from the recording medium 80 to the medium slot 1020 is transferred to the first air-cooling duct 1000 may be adopted. Even with this configuration, the cooling effect can be expected due to heat transfer from the portion where the first air cooling duct 1000 and the medium slot 1020 overlap.

Next, a third embodiment of the present invention will be described with reference to FIGS. 17A to 26. Mainly, the differences from the first embodiment will be described. Those which are not specifically mentioned are the same as those described in the first embodiment.

Figure 17A:
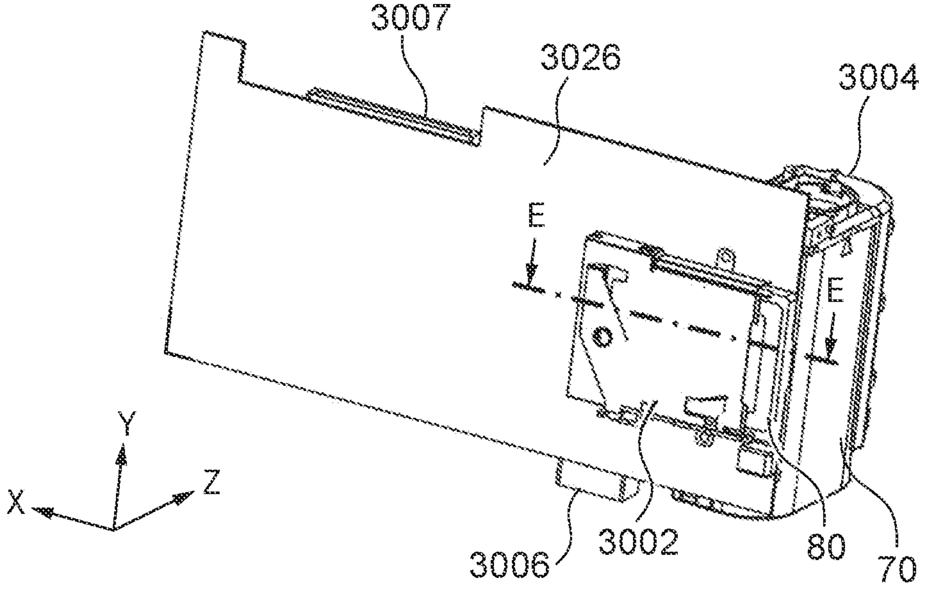
FIGS. 17A and 17B are a rear perspective view and a front perspective view, respectively, showing a main portion of a heat dissipating structure for a recording medium.
Figure 17B:
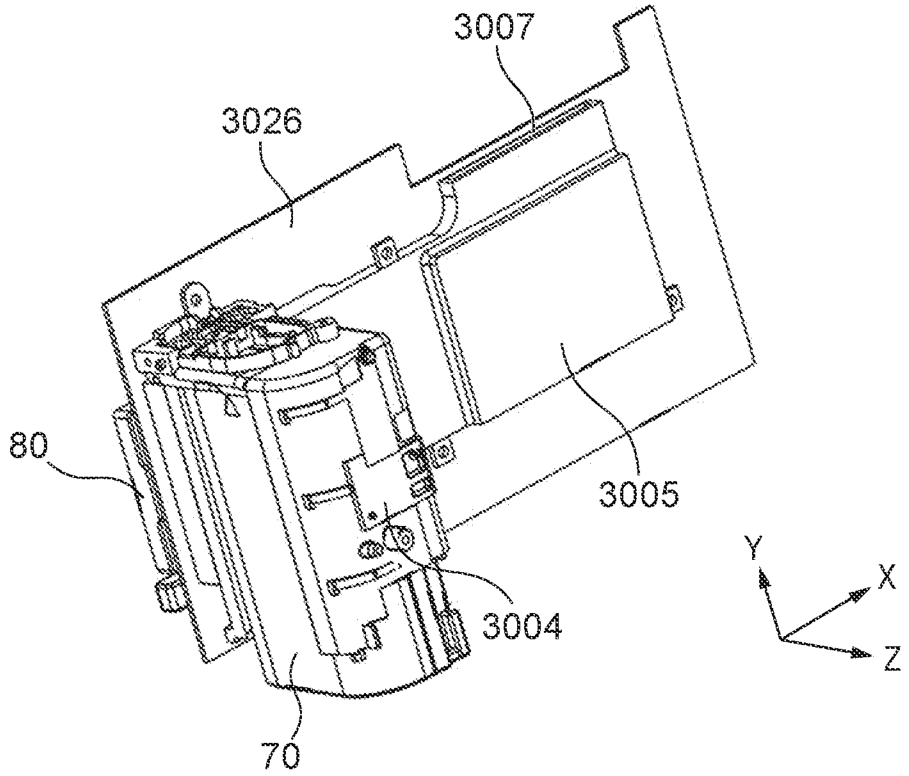

FIG. 17A and FIG. 17B are perspective views showing a main portion of the heat dissipating structure for the recording medium 80. FIG. 17A is a rear perspective view, and FIG. 17B is a front perspective view.

The recording medium 80, which is the heat source, has been inserted into a medium slot 3002 mounted on a control circuit board 3026. The battery 70 has been housed in a battery housing unit 3004. A first air-cooling duct 3005 has an intake port 3006 leading to the first intake port 5 (see FIG. 1B) and an exhaust port 3007 leading to the duct connecting portion 17 (see FIG. 2A). In addition, the cooling fan 15 (see FIG. 2A) causes the air to flow from the intake port 3006 toward the exhaust port 3007 within the first air-cooling duct 3005. The heat generated in the recording medium 80 is discharged to the outside of the image pickup apparatus main body 2 (see FIG. 1A, FIG. 1B, and FIG. 1C) through the air flowing within the first air-cooling duct 3005. Cooling of the recording medium 80 will be described below.

Figure 18A:
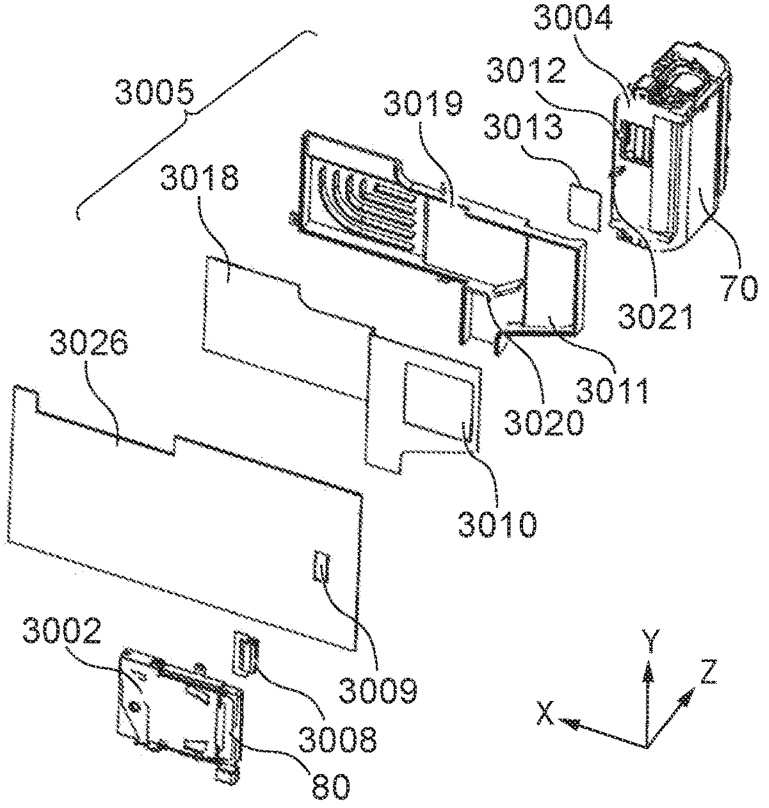
FIGS. 18A and 18B are a rear exploded perspective view and a front exploded perspective view, respectively, showing the main portion of the heat dissipating structure for the recording medium.
Figure 18B:
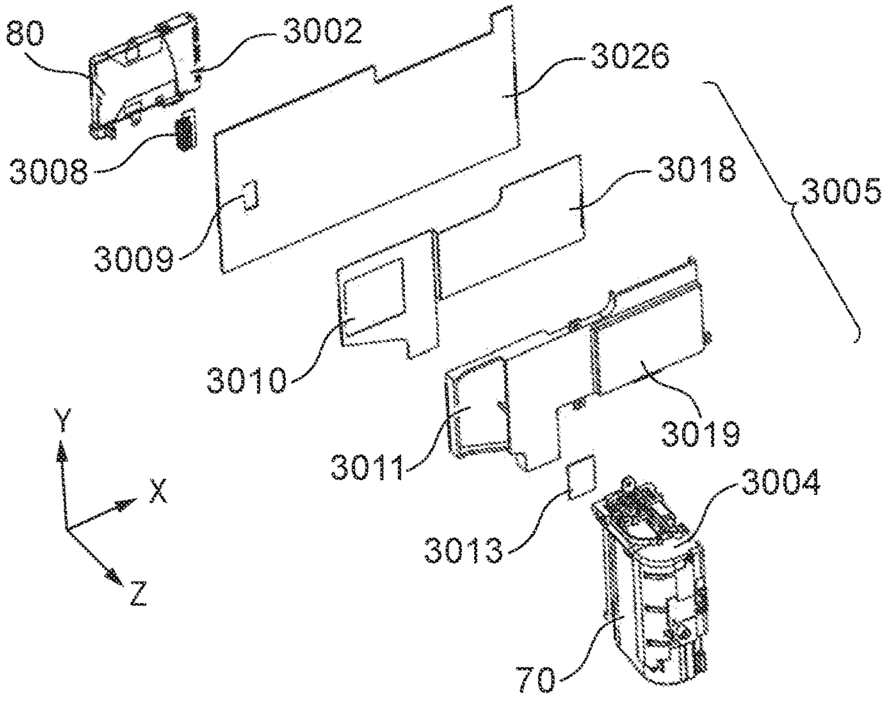

FIG. 18A and FIG. 18B are exploded perspective views showing the main portion of the heat dissipating structure for the recording medium 80. FIG. 18A is a rear exploded perspective view, and FIG. 18B is a front exploded perspective view.

An elastic heat transfer member 3008 with high thermal conductivity and high elasticity is disposed in a board opening portion 3009 of the control circuit board 3026. In a state where the recording medium 80 has been housed in the medium slot 3002, the elastic heat transfer member 3008 is in contact with the recording medium 80, and a portion of the elastic heat transfer member 3008 is exposed within the first air-cooling duct 3005 from (through) the board opening portion 3009. The positional relationship among them will be described in detail below.

In the first air-cooling duct 3005, a lid opening 3010 is formed in a duct lid member 3018 on an optical axis projection of the recording medium 80. In addition, a duct opening 3011 is formed on an optical axis projection of the battery 70. Furthermore, a housing member opening 3012 is formed in the battery housing unit 3004. The housing member opening 3012 is sealed with a heat transfer plate 3013 that has high thermal conductivity.

Figure 19:
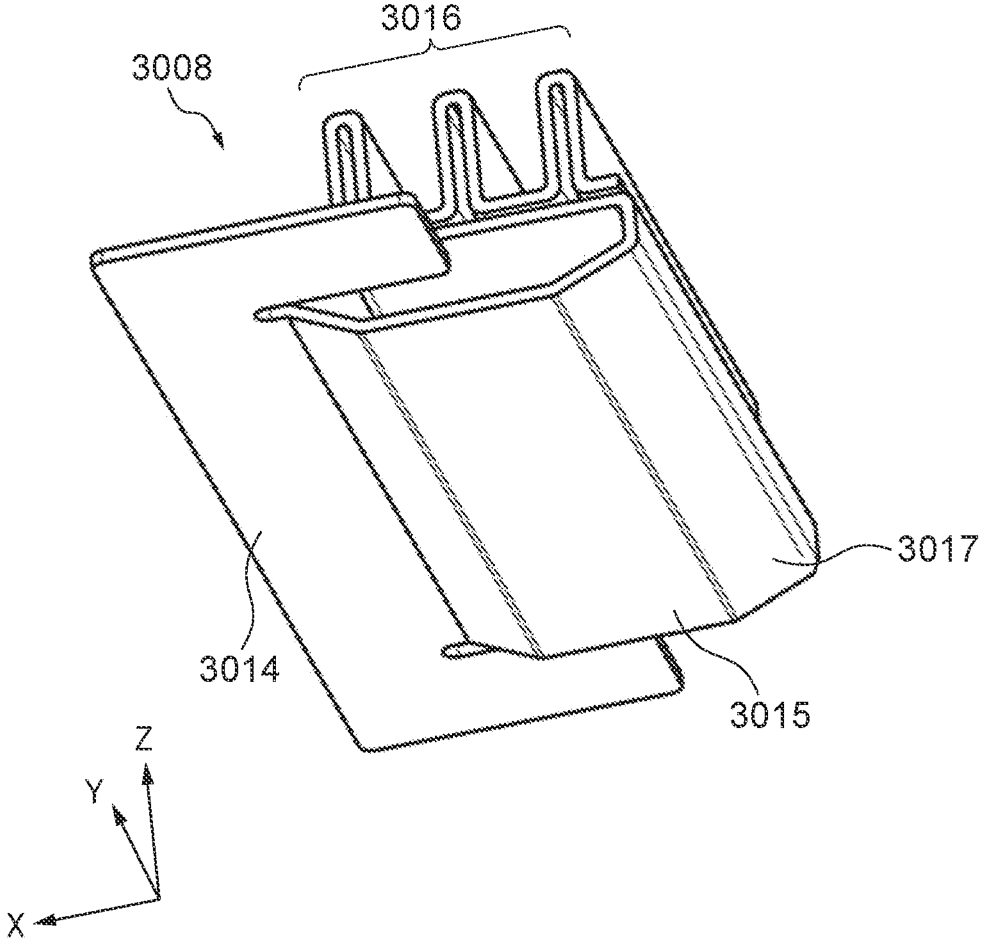
FIG. 19 is a perspective view of an elastic heat transfer member.
Figure 20A:
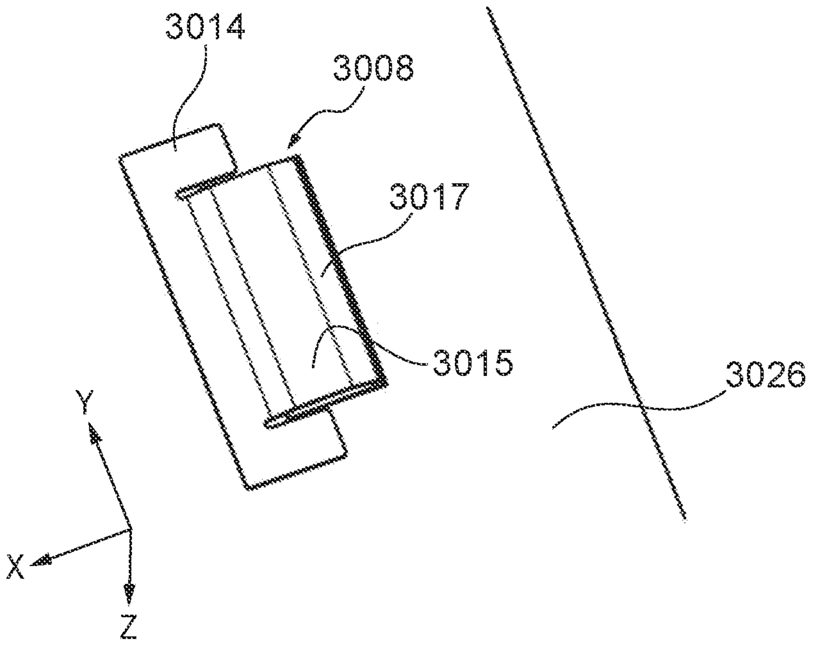
FIGS. 20A and 20B are a rear perspective view and a front perspective view, respectively, showing a positional relationship between a control circuit board and the elastic heat transfer member.
Figure 20B:
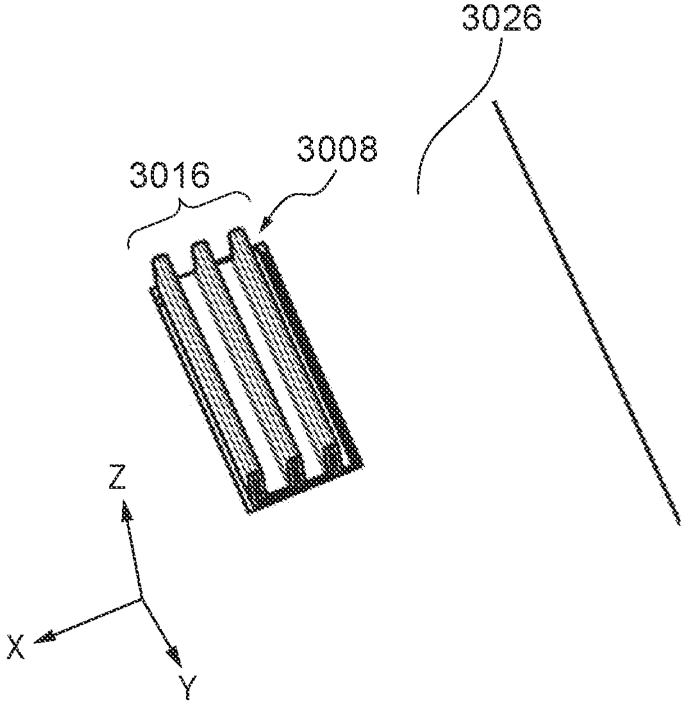

The detailed configuration of the elastic heat transfer member 3008 will be described with reference to FIGS. 19, 20A, and 20B. FIG. 19 is a perspective view of the elastic heat transfer member 3008. FIG. 20A and FIG. 20B are perspective views showing the positional relationship between the control circuit board 3026 and the elastic heat transfer member 3008. FIG. 20A is a rear perspective view, and FIG. 20B is a front perspective view.

The elastic heat transfer member 3008 has a mounting portion 3014 to be mounted on a surface of the control circuit board 3026 on the −Z side. In addition, the elastic heat transfer member 3008 has a heat transfer surface 3015 that is in contact with the recording medium 80 (see FIG. 17A) and performs heat transfer. Moreover, the elastic heat transfer member 3008 has a fin portion 3016 for effectively transferring the heat to the air flowing within the first air-cooling duct 3005. The fin portion 3016 protrudes into the first air-cooling duct 3005 (see FIG. 17B) from the board opening portion 3009 (see FIG. 18B). In addition, the elastic heat transfer member 3008 has an inclined portion 3017 for making the insertion of the recording medium 80 smooth. The abutment relationship between the recording medium 80 and the elastic heat transfer member 3008 when the recording medium 80 is inserted will be described below.

Figure 21:
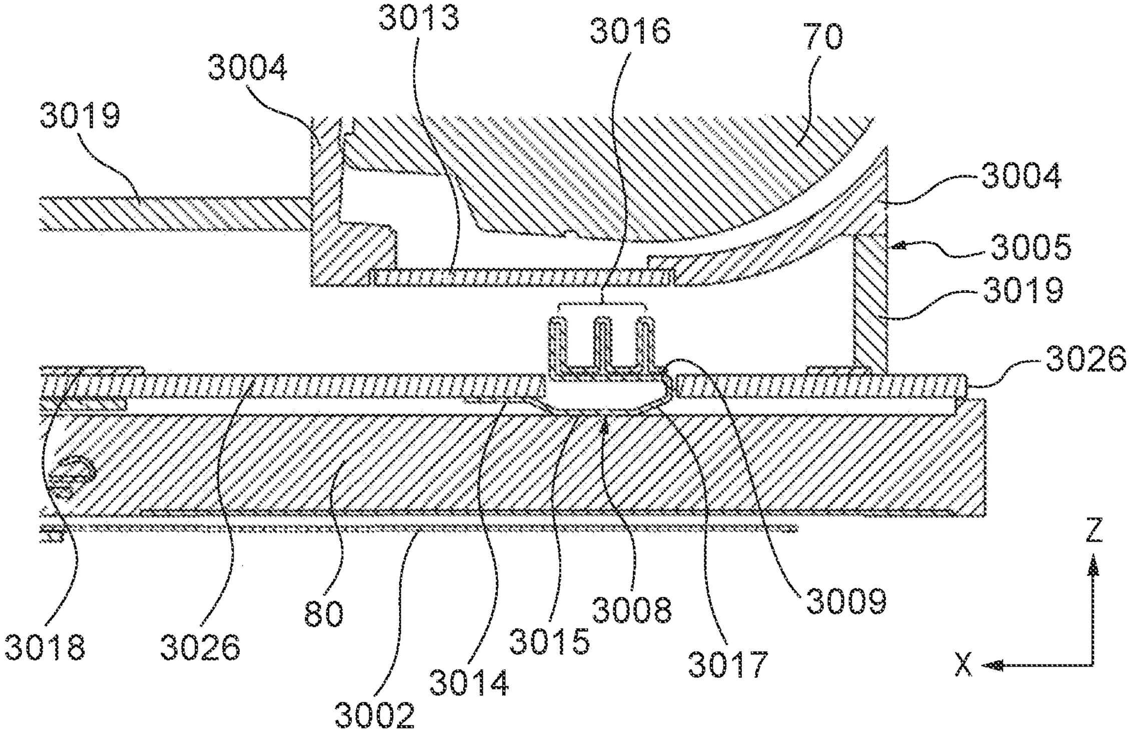
FIG. 21 is a cross-sectional view taken along line E-E in FIG. 17A.

Air flow paths within the first air-cooling duct 3005 and the dissipation of the heat from the recording medium 80 will be described with reference to FIG. 21 and FIG. 22. FIG. 21 is a cross-sectional view taken along line E-E in FIG. 17A.

A wall of the first air-cooling duct 3005 on the recording medium 80 side (the −Z side) includes the duct lid member 3018, the control circuit board 3026 exposed from the lid opening 3010 (see FIG. 18A), and a portion of the elastic heat transfer member 3008. The heat generated by the recording medium 80 is air-cooled by being transferred to the air flowing within the first air-cooling duct 3005 via the elastic heat transfer member 3008. Since the elastic heat transfer member 3008 has the fin portion 3016, the surface area of the elastic heat transfer member 3008 increases, and as a result, it is possible to enhance the cooling efficiency of the recording medium 80.

In addition, the heat generated by the recording medium 80 is also transferred from the mounting portion 3014 of the elastic heat transfer member 3008 to the control circuit board 3026. Since the control circuit board 3026 is exposed into the first air-cooling duct 3005, it is also possible to transfer the heat from the control circuit board 3026 to the air flowing within the first air-cooling duct 3005, and as a result, it is possible to enhance the cooling efficiency of the recording medium 80.

A wall of the first air-cooling duct 3005 on the battery 70 side (the +Z side) includes a duct base member 3019, and the battery housing unit 3004, which is exposed from the duct opening 3011 (see FIG. 18A) of the duct base member 3019. A portion of the battery housing unit 3004 is constituted by the heat transfer plate 3013. In other words, at least a part of a portion of the battery housing unit 3004 which is exposed into the first air-cooling duct 3005 is constituted by the heat transfer plate 3013, which is a thermal conducting member.

Since a portion of the battery housing unit 3004 also serves as a portion of the first air-cooling duct 3005, it is possible to make the first air-cooling duct 3005 thinner. As a result, it is possible to make the gripping portion 9 (see FIG. 1A) of the image pickup apparatus 1 thinner in the optical axis direction. It should be noted that although a portion of the battery housing unit 3004 also serves as a portion of the first air-cooling duct 3005, a portion of the first air-cooling duct 3005 may also serve as a portion of the battery housing unit 3004.

Moreover, since the heat transfer plate 3013 also serves as a portion of the first air-cooling duct 3005, it is also possible to enhance the cooling efficiency of the battery 70. Although in the third embodiment, the battery 70 and the heat transfer plate 3013 are not in contact with each other, a configuration, in which the battery 70 and the heat transfer plate 3013 are in contact with each other, may be adopted.

Figure 22:
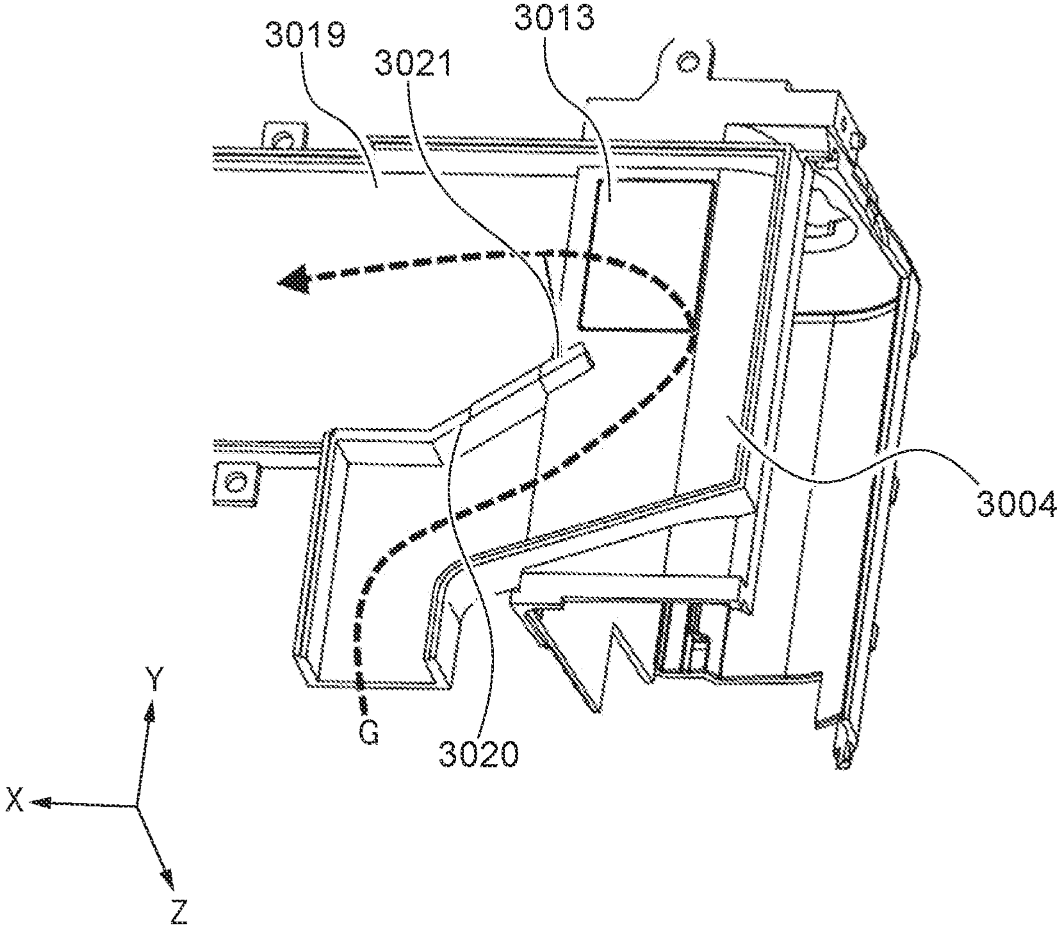
FIG. 22 is a perspective view that shows a flow path in a first air-cooling duct.

FIG. 22 is a perspective view that shows a flow path in the first air-cooling duct 3005. The duct base member 3019 has a first rectifying rib 3020 that protrudes substantially in the optical axis direction. In addition, the battery housing unit 3004 has a second rectifying rib 3021 that protrudes substantially in the optical axis direction (also see FIG. 18A). Due to the action of the first rectifying rib 3020 and the second rectifying rib 3021, as indicated by a broken-line arrow G, the air flow path within the first air cooling duct 3005 becomes a flow path bypassing the first rectifying rib 3020 and the second rectifying rib 3021. As a result, a flow of the air is generated throughout the duct, and it is possible to enhance the cooling efficiency of the recording medium 80.

Figure 23A:
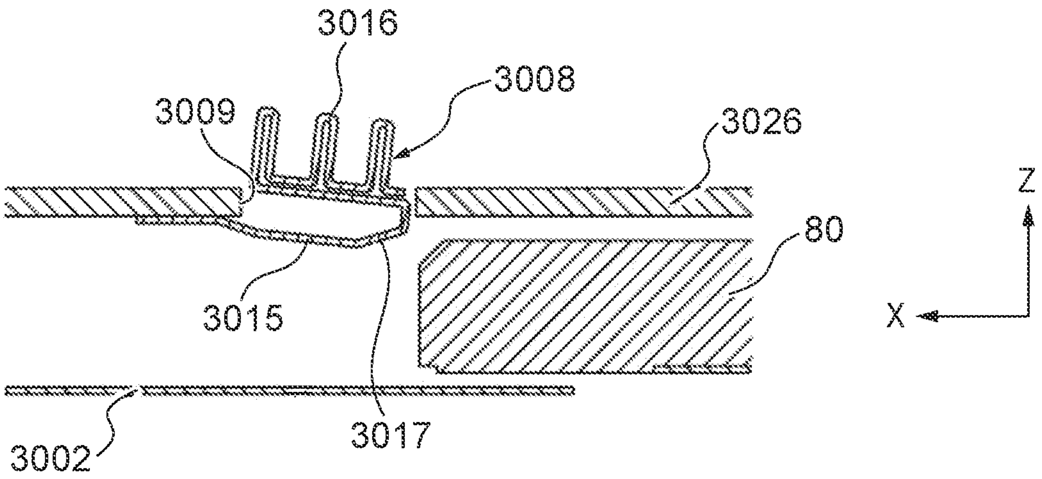
FIGS. 23A, 23B, and 23C are enlarged views of the elastic heat transfer member and its vicinity.
Figure 23B:
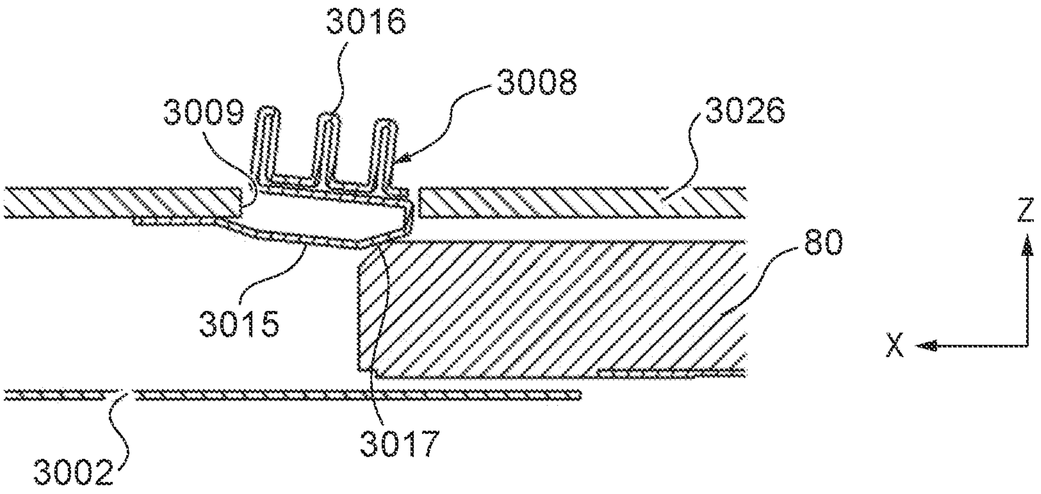
Figure 23C:
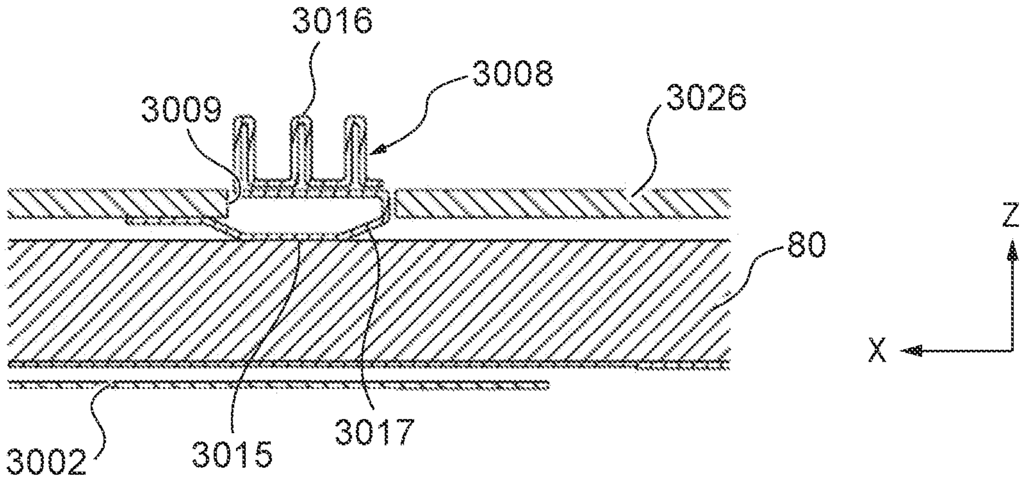

The abutment relationship between the recording medium 80 and the elastic heat transfer member 3008 during the insertion process of the recording medium 80 will be described with reference to FIG. 23A, FIG. 23B, and FIG. 23C. FIGS. 23A, 23B, and 23C are enlarged views of the elastic heat transfer member 3008 and its vicinity in a cross section taken along line E-E in FIG. 17A.

FIG. 23A shows an initial state of insertion before the recording medium 80 abuts on the elastic heat transfer member 3008. In this initial state, a portion of the elastic heat transfer member 3008 and a portion of the recording medium 80 overlap each other when viewed from a direction in which the recording medium 80 is inserted (the direction of the X axis).

FIG. 23B shows a state in which the recording medium 80 is being inserted into the medium slot 3002. In the insertion process of the recording medium 80, the recording medium 80 first abuts on the inclined portion 3017 of the elastic heat transfer member 3008. As a result, it is possible to alleviate the force that the recording medium 80 receives from the elastic heat transfer member 3008.

FIG. 23C shows a state in which the recording medium 80 has been inserted into the medium slot 3002. In this state, the heat transfer surface 3015 of the elastic heat transfer member 3008 and the recording medium 80 are in contact with each other.

It should be noted that as shown in FIG. 23C, the configuration, in which the fin portion 3016 of the elastic heat transfer member 3008 protrudes into the first air-cooling duct 3005, has been adopted. However, in the case of making the first air-cooling duct 3005 thinner is important, a configuration in which the fin portion 3016 is removed from the elastic heat transfer member 3008 may be adopted. In this case, although the elastic heat transfer member 3008 is connected to the first air-cooling duct 3005 through the board opening portion 3009, the elastic heat transfer member 3008 is disposed at a position that does not protrude in the +Z direction than the control circuit board 3026.

According to the third embodiment, the first air-cooling duct 3005 is disposed on the rear side in the optical axis direction than the image pickup device board 102 and on the front side in the optical axis direction than the control circuit board 3026 and the medium slot 3002. The first air-cooling duct 3005 is thermally connected to the control circuit board 3026. Therefore, according to the third embodiment, the same effects as those in the first embodiment can be achieved in terms of efficiently cooling the recording medium 80 while suppressing the increase in the size of the image pickup apparatus 1.

In addition, the elastic heat transfer member 3008 is disposed in the board opening portion 3009 of the control circuit board 3026. Moreover, the heat transfer surface 3015 (a first heat transfer portion) and the recording medium 80 abut on each other, and the fin portion 3016 (a second heat transfer portion) is exposed into the first air-cooling duct 3005 from the board opening portion 3009 (see FIG. 21). In particular, the fin portion 3016 protrudes into the first air-cooling duct 3005. As a result, it is possible to efficiently cool the recording medium 80.

Furthermore, in the optical axis direction, the first air-cooling duct 3005 is disposed between the battery 70 and the control circuit board 3026, and the heat transfer plate 3013, which constitutes a portion of the battery housing unit 3004, also serves as a portion of the first air-cooling duct 3005 (see FIG. 21). Since at least a portion of the battery housing unit 3004 also serves as at least a portion of the first air-cooling duct 3005, it is possible to make the gripping portion 9 of the image pickup apparatus 1 thinner in the optical axis direction. Moreover, the heat transfer plate 3013 also serves as a portion of the first air-cooling duct 3005. In other words, at least a part of a portion of the battery housing unit 3004 which is exposed into the first air-cooling duct 3005 is constituted by the heat transfer plate 3013, which is the thermal conducting member. As a result, it is also possible to enhance the cooling efficiency of the battery 70.

In addition, since at least a portion of the control circuit board 3026 also serves as at least a portion of the first air-cooling duct 3005 (see FIG. 21), it is possible to suppress the increase in the size of the image pickup apparatus 1.

Next, a modification of the third embodiment will be described with reference to FIGS. 24 to 26. In the modification of the third embodiment, a second elastic heat transfer member 3022 is employed in place of the elastic heat transfer member 3008 (see FIG. 19).

Figure 24:
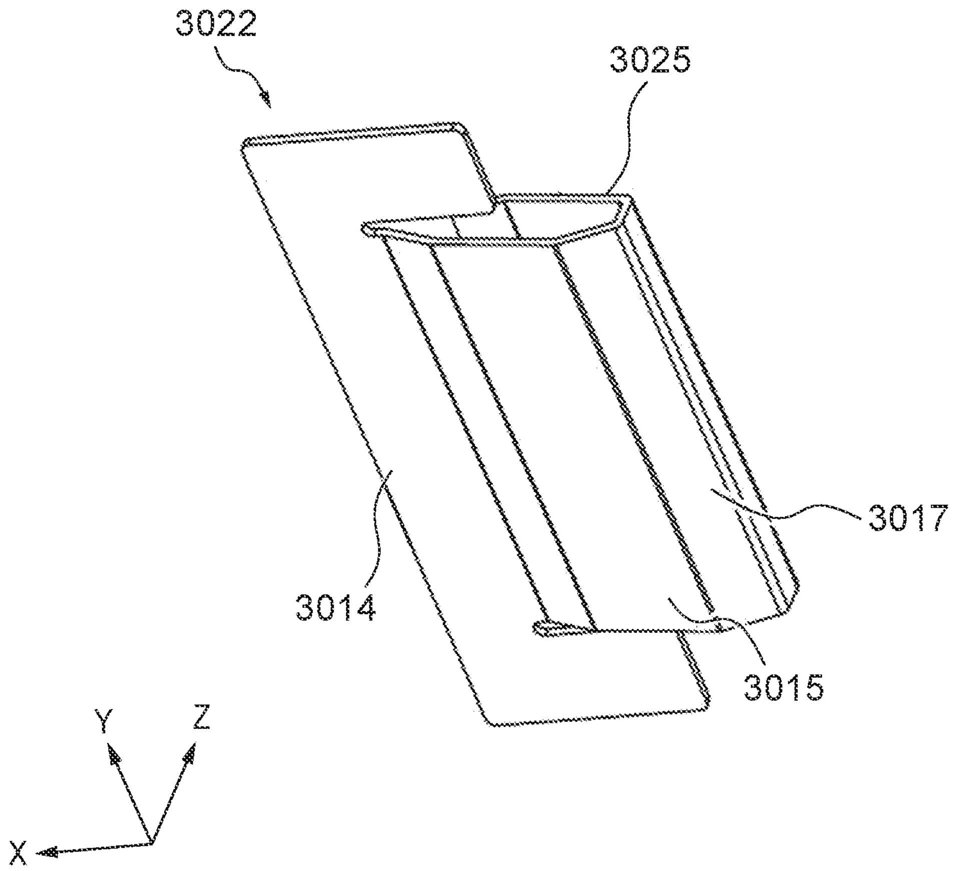
FIG. 24 is a perspective view of a second elastic heat transfer member.

FIG. 24 is a perspective view of the second elastic heat transfer member 3022. The second elastic heat transfer member 3022 is disposed in the board opening portion 3009 of the control circuit board 3026. The material of the second elastic heat transfer member 3022 is the same as that of the elastic heat transfer member 3008, and is a material such as metal with high elasticity and high thermal conductivity. The shape of the second elastic heat transfer member 3022 corresponds to a shape in which the elastic heat transfer member 3008 is provided with a second heat transfer surface 3025 instead of the fin portion 3016.

Figure 25:
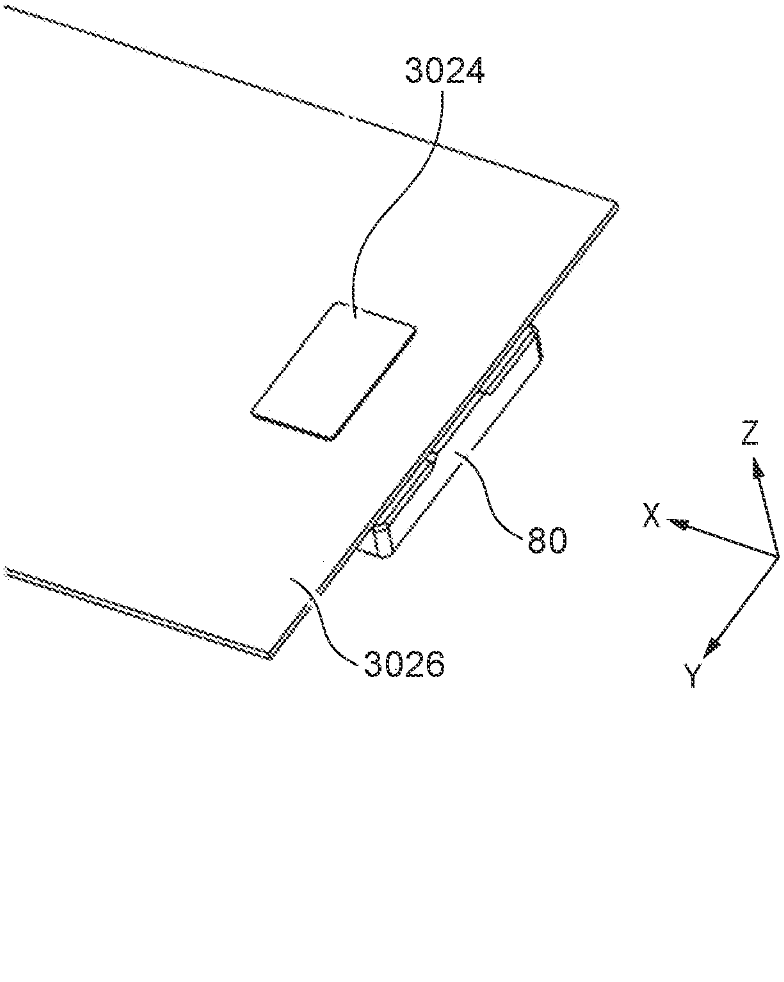
FIG. 25 is a perspective view of the control circuit board.

FIG. 25 is a perspective view of the control circuit board 3026. A heat transfer sheet member 3024, which is a heat transfer sealing member, is disposed on a surface of the control circuit board 3026 on the +Z side (a surface opposite to the recording medium 80). The heat transfer sheet member 3024 is made of a material with high thermal conductivity such as metal, or a thin member such as a film.

Figure 26:
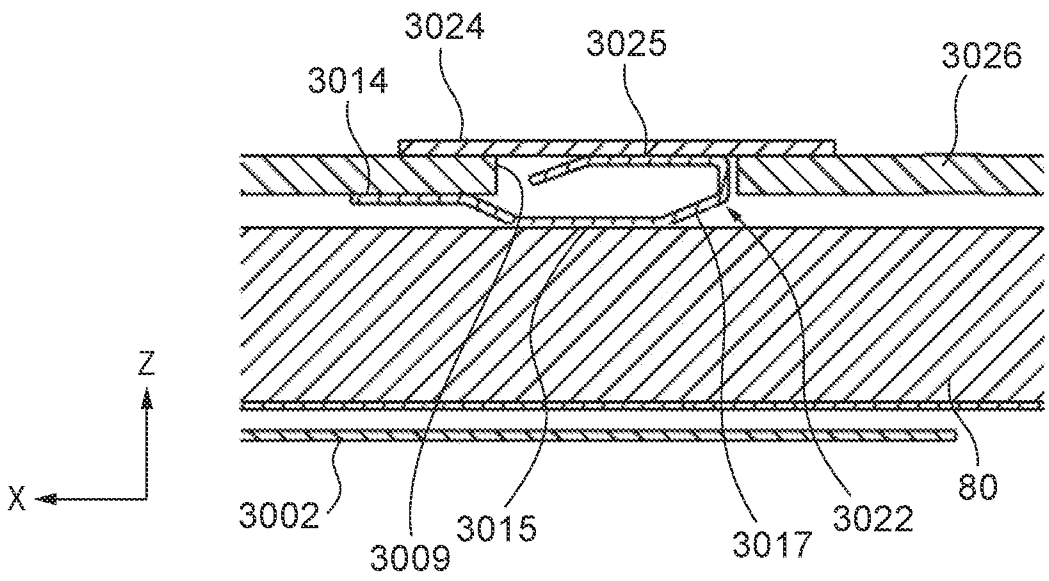
FIG. 26 is an enlarged view of the second elastic heat transfer member and its vicinity.

FIG. 26 is an enlarged view of the second elastic heat transfer member 3022 and its vicinity, and corresponds to FIG. 23C. The heat transfer sheet member 3024 is disposed to cover the board opening portion 3009 (see FIG. 18B). The heat transfer surface 3015 of the second elastic heat transfer member 3022 is in contact with the recording medium 80, and the second heat transfer surface 3025 of the second elastic heat transfer member 3022 is in contact with the heat transfer sheet member 3024. As a result, the heat generated in the recording medium 80 is transferred to the air flowing within the first air-cooling duct 3005 via the second elastic heat transfer member 3022 and the heat transfer sheet member 3024. In this configuration, by sealing the board opening portion 3009, there is an effect of enhancing the dust-proof and drip-proof performance of the recording medium 80. Furthermore, the absence of the fin portion 3016 has the effect of making it possible to constitute a thin duct.

As described above, according to the modification of the third embodiment, the heat transfer sheet member 3024 is exposed into the first air-cooling duct 3005. The heat transfer surface 3015 (the first heat transfer portion) of the second elastic heat transfer member 3022 and the recording medium 80 abut on each other, and the second heat transfer surface 3025 (a second heat transfer portion) of the second elastic heat transfer member 3022 and the heat transfer sheet member 3024 are in contact with each other. Therefore, it is possible to more efficiently cool the recording medium 80.

Figure 27:
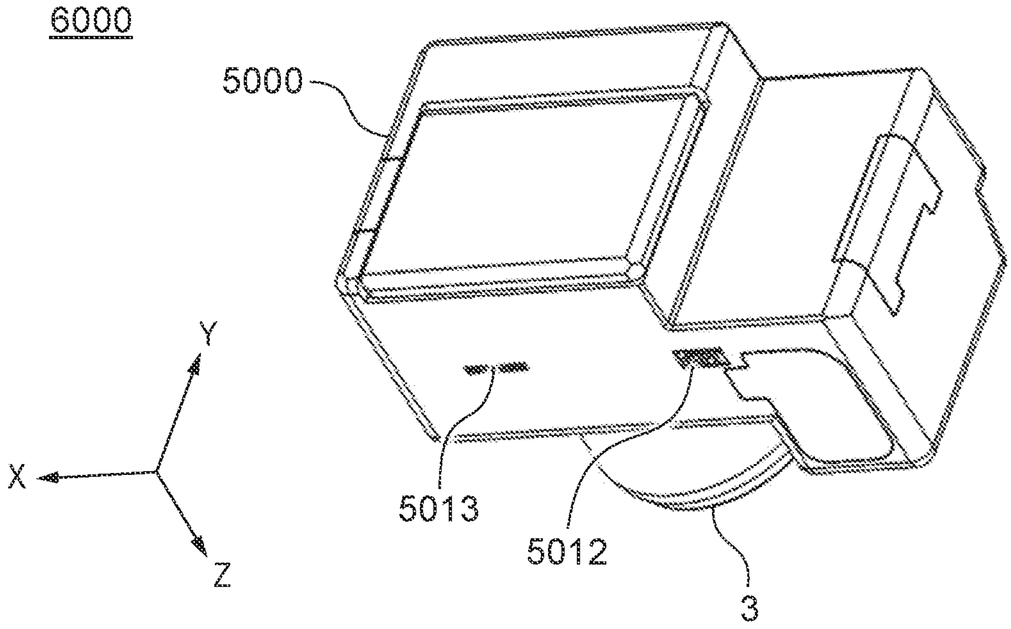
FIG. 27 is a perspective view of a bottom surface side of the image pickup apparatus.

Next, a fourth embodiment of the present invention will be described. FIG. 27 is a perspective view of a bottom surface side (the −Y side) of an image pickup apparatus 6000 according to the fourth embodiment of the present invention. The image pickup apparatus 6000 includes an image pickup apparatus main body 5000 and the lens 3. The configuration of the lens 3 is the same as that of the first embodiment.

The fourth embodiment differs from the first embodiment mainly in the forced air-cooling structure of the medium slot 202 (see FIG. 3A). Those which are not specifically mentioned are the same as those described in the first embodiment.

As shown in FIG. 27, a first intake port 5012 and a second intake port 5013 through which the outside air is taken into the image pickup apparatus main body 5000 by the forced air-cooling mechanism are disposed on the bottom surface (a surface on the −Y side) of the image pickup apparatus main body 5000.

Figure 28:
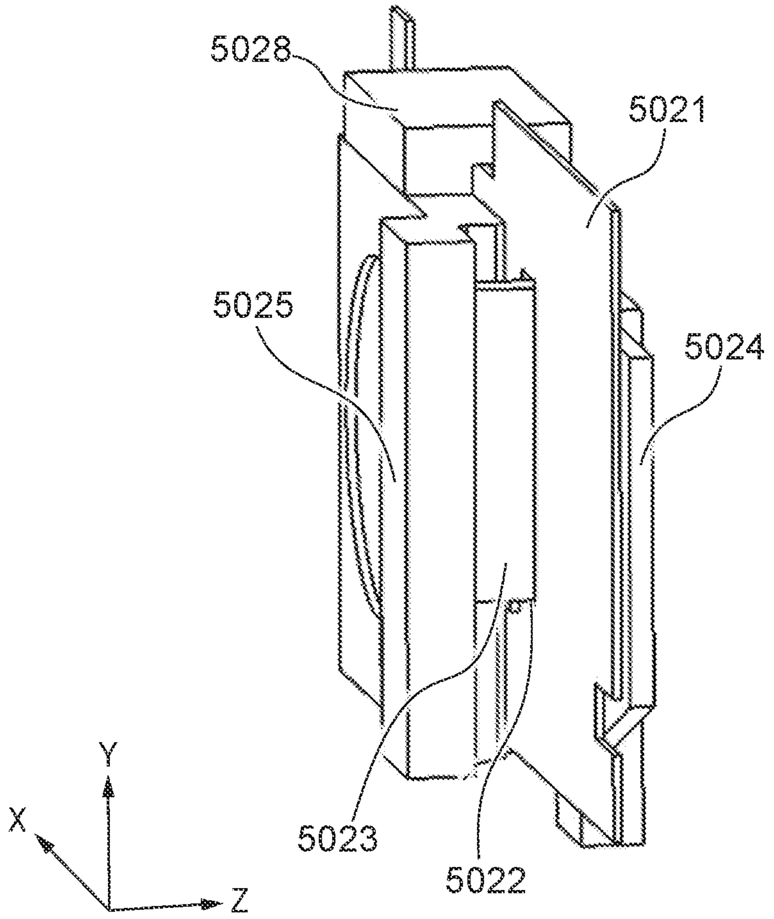
FIG. 28 is a perspective view of the control circuit board and air-cooling ducts.

FIG. 28 is a perspective view of a control circuit board 5021 and air-cooling ducts. With reference to FIG. 28, a second air-cooling duct 5025 that cools the IC 201 (see FIG. 3A) on the control circuit board 5021, and a first air-cooling duct 5024 that cools the recording medium 80 and the image pickup device unit 11 (see FIG. 3A) will be mainly described.

As shown in FIG. 28, the second air-cooling duct 5025 and the first air-cooling duct 5024 are connected by a duct connecting portion 5028 that straddles the control circuit board 5021. Furthermore, the first air-cooling duct 5024 and the second air-cooling duct 5025 are also connected by a third air-cooling duct 5023 in addition to the duct connecting portion 5028.

A board opening portion 5022, which is a through hole through which the third air-cooling duct 5023 passes, is provided in the control circuit board 5021. The third air-cooling duct 5023 passes through the board opening portion 5022 to connect the first air-cooling duct 5024 and the second air-cooling duct 5025. Details of the board opening portion 5022 and the third air-cooling duct 5023 will be described below.

Figure 29A:
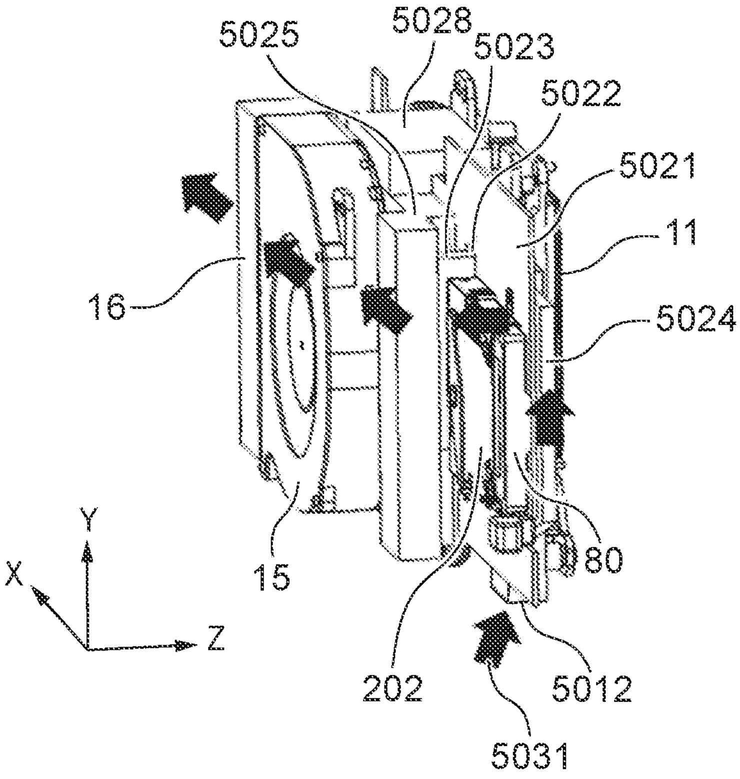
FIGS. 29A and 29B are a rear perspective view and a front perspective view, respectively, of the control circuit board and its vicinity.
Figure 29B:
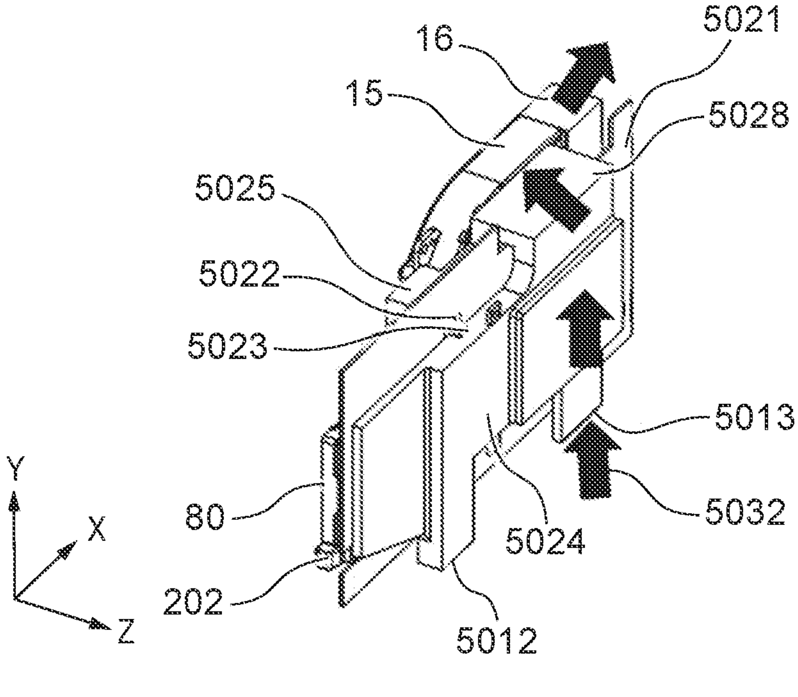

The flow of the air for air-cooling the recording medium 80 will be described with reference to FIG. 29A and FIG. 29B. FIG. 29A is a rear perspective view of the control circuit board 5021 and its vicinity, and FIG. 29B is a front perspective view of the control circuit board 5021 and its vicinity.

The flow of first air 5031 passing through the third air-cooling duct 5023 is as follows. As shown in FIG. 29A, the first air 5031 is taken in from the first intake port 5012 by the rotation of the cooling fan 15, passes through the first air-cooling duct 5024, the third air-cooling duct 5023, the second air-cooling duct 5025, and the cooling fan 15 in this order, and is discharged to the exhaust port connecting portion 16.

The flow of second air 5032 passing through the duct connecting portion 5028 is as follows. As shown in FIG. 29B, the second air 5032 is taken in from the second intake port 5013 by the rotation of the cooling fan 15, passes through the first air-cooling duct 5024, the duct connecting portion 5028, the second air-cooling duct 5025, and the cooling fan 15 in this order, and is discharged to the exhaust port connecting portion 16.

The first air 5031 mainly effectively cools the recording medium 80, and the IC 201 on the control circuit board 5021. In addition, the second air 5032 mainly effectively cools the image pickup device unit 11 and the control circuit board 5021.

Figure 30:
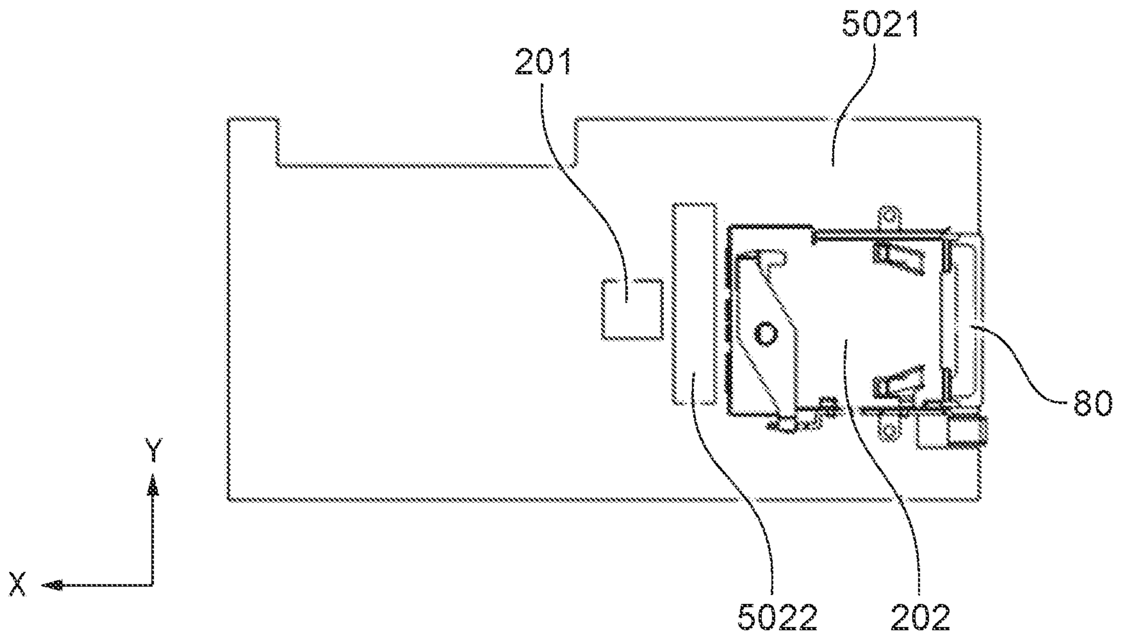
FIG. 30 is an XY plan view of the control circuit board as seen from the rear.

FIG. 30 is an XY plan view of the control circuit board 5021 when viewed from the rear surface side (the −Z side). The arrangement of the board opening portion 5022 will be described. The medium slot 202 and the IC 201 are disposed on the control circuit board 5021. In order to effectively cool the recording medium 80, the third air-cooling duct 5023 is disposed near the medium slot 202. Therefore, the board opening portion 5022, through which the third air-cooling duct 5023 passes, is disposed at a position close to the medium slot 202.

Here, the IC 201 that generates a large amount of heat is disposed on the control circuit board 5021. In the case that the IC 201 is disposed near the medium slot 202, there is a concern that the heat generated by the IC 201 will be transferred to the medium slot 202 and the recording medium 80 will become even hotter. Therefore, in the fourth embodiment, by disposing the board opening portion 5022 between the medium slot 202 and the IC 201 in the direction of the X-axis, the board opening portion 5022 also serves to thermally isolate the medium slot 202 and the IC 201 from each other.

It should be noted that the shape of the board opening portion 5022 does not have to be a quadrangular shape as shown in FIG. 30 as long as the third air-cooling duct 5023 can pass through the board opening portion 5022. In addition, a member other than the third air-cooling duct 5023, such as wiring, may pass through the board opening portion 5022, as long as it does not interfere with the arrangement of the third air-cooling duct 5023 and the dissipation of the heat from the medium slot 202. In other words, it does not matter whether or not a member passes through the board opening portion 5022, and it does not matter what kind of member passes through the board opening portion 5022.

Figure 31A:
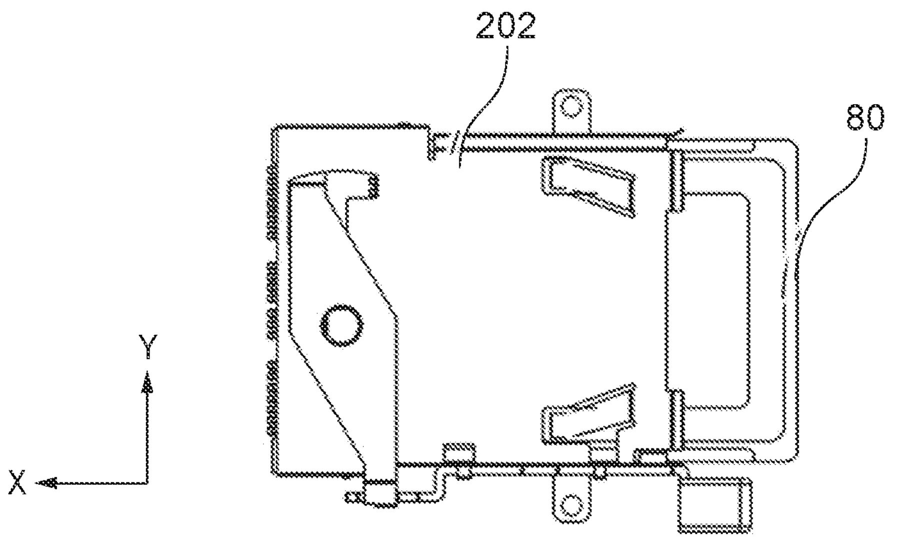
FIGS. 31A and 31B are XY plan views of a medium slot, into which the recording medium has been inserted, as seen from the rear and the front, respectively.
Figure 31B:
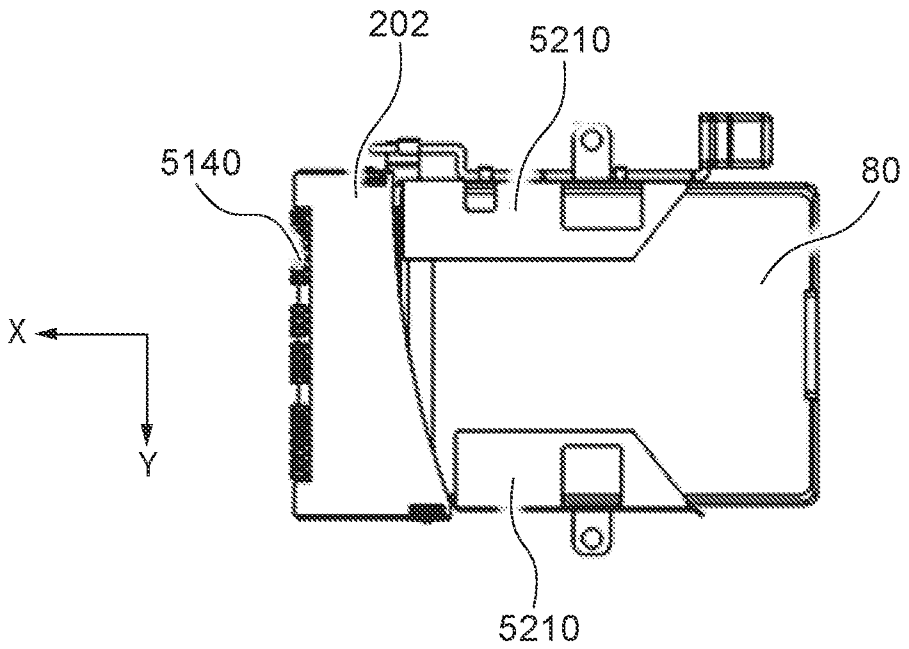

FIGS. 31A and 31B are XY plan views of the medium slot 202, into which the recording medium 80 has been inserted, when viewed from the rear and the front, respectively. The shape of the medium slot 202 will be described.

The medium slot 202 is electrically connected to the control circuit board 5021 through a contact 5140 shown in FIG. 31B. The exterior of the medium slot 202 has a shape that includes a wraparound portion 5210 that wraps around between the recording medium 80 and the control circuit board 5021. Therefore, when viewed from a mounting surface side (the +Z side) of the control circuit board 5021, at least a portion of the recording medium 80 and at least a portion of the wraparound portion 5210 overlap each other.

Figure 32:
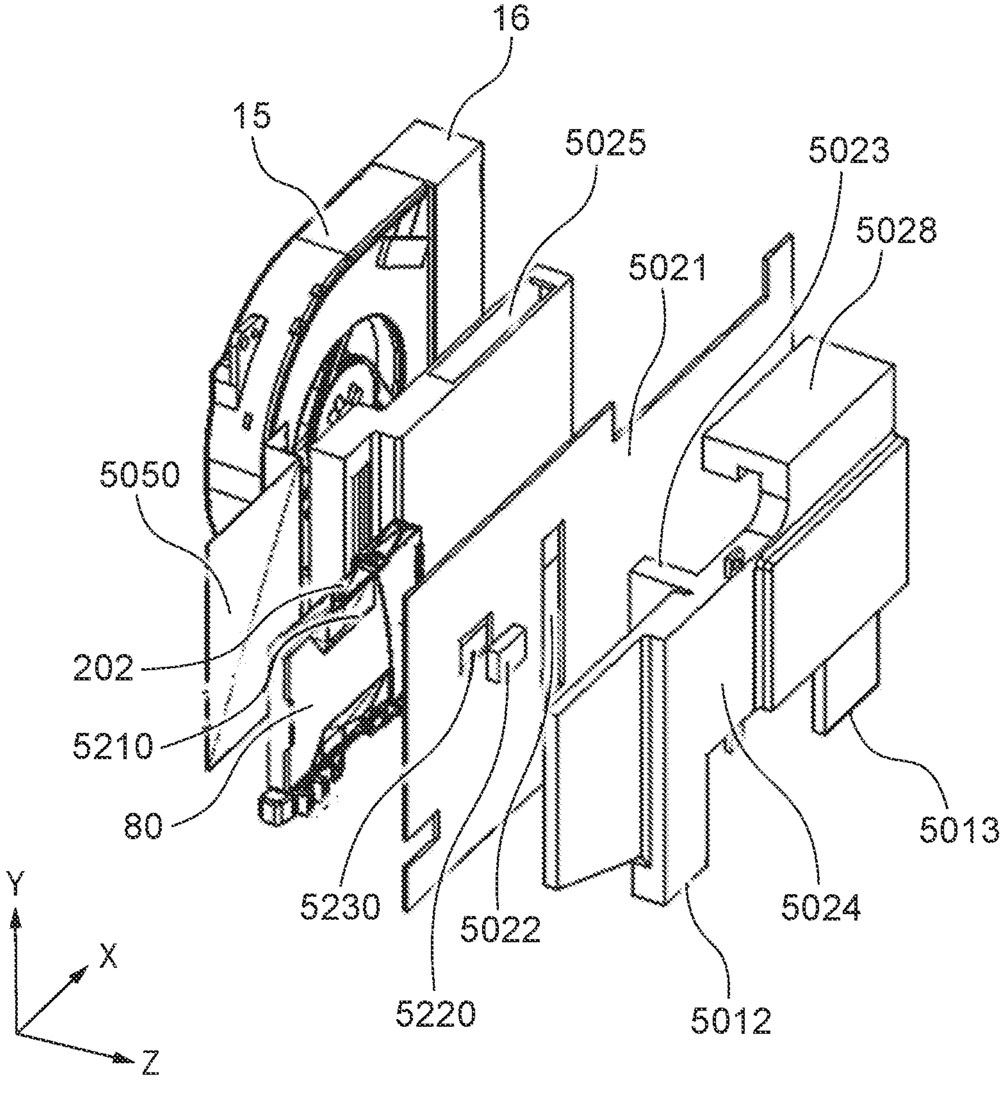
FIG. 32 is a front exploded perspective view of the control circuit board, the medium slot, and a structure related to an air flow path.

Next, the heat dissipating structure of the medium slot 202 will be described with reference to FIG. 32. FIG. 32 is a front exploded perspective view of the control circuit board 5021, the medium slot 202, and the structure related to the air flow path.

In the control circuit board 5021, a through hole 5230 is provided in a region where the control circuit board 5021 and the wraparound portion 5210 overlap each other in terms of projection (on projection) when viewed from the optical axis direction. A heat dissipating member 5220 that has elasticity is disposed in the through hole 5230. As a result, the wraparound portion 5210 of the medium slot 202 and the first air-cooling duct 5024 are thermally connected to each other via the heat dissipating member 5220.

The through hole 5230 is formed with such a size and at such a position that the recording medium 80 is not exposed from the through hole 5230 when the recording medium 80 is inserted into the medium slot 202. As a result, the heat dissipating member 5220 does not interfere with the insertion and removal of the recording medium 80 and does not apply a load to the recording medium 80.

In addition, the second air-cooling duct 5025 and the medium slot 202 are thermally connected to each other via a heat dissipating member 5050. Moreover, the medium slot 202 and the third air-cooling duct 5023 are thermally connected to each other via the heat dissipating member 5050.

Here, by disposing the board opening portion 5022 and the third air-cooling duct 5023 near the medium slot 202, it is possible to cause the cold air taken in from the first intake port 5012 to flow near the medium slot 202. As a result, it is possible to more effectively perform dissipating of the heat from the medium slot 202 via the heat dissipating member 5050. Since the medium slot 202 is thermally connected to the respective air-cooling ducts, it is possible to improve the heat dissipation efficiency of the medium slot 202.

According to the fourth embodiment, the first air-cooling duct 5024 is disposed on the rear side in the optical axis direction than the image pickup device unit 11 and on the front side in the optical axis direction than the control circuit board 5021 and the medium slot 202. The first air-cooling duct 5024 is thermally connected to the control circuit board 5021. Therefore, according to the fourth embodiment, the same effects as those in the first embodiment can be achieved in terms of efficiently cooling the recording medium 80 while suppressing the increase in the size of the image pickup apparatus 1.

Moreover, the third air-cooling duct 5023 passes through the board opening portion 5022 of the second air-cooling duct 5025, and connects the first air-cooling duct 5024 and the second air-cooling duct 5025. At least one of the second air-cooling duct 5025 and the third air-cooling duct 5023 is thermally connected to the medium slot 202 by the sheet-shaped heat dissipating member 5050. As a result, it is possible to efficiently cool the medium slot 202.

Furthermore, the board opening portion 5022 is located between the IC 201, which is a main heat source on the control circuit board 5021, and the medium slot 202 when viewed from the optical axis direction (see FIG. 30). As a result, since the medium slot 202 and the IC 201 are thermally isolated from each other, it is possible to enhance the heat dissipation efficiency of the medium slot 202.

Moreover, the medium slot 202 and the first air-cooling duct 5024 are thermally connected to each other via the heat dissipating member 5220 disposed in the through hole 5230 (see FIG. 32). As a result, it is possible to enhance the heat dissipation efficiency of the medium slot 202.

Furthermore, since the recording medium 80 is not exposed from the through hole 5230 toward the first air-cooling duct 5024, it is possible to suppress the load on the recording medium 80.

A modification of the fourth embodiment will be described with reference to FIG. 33. In the modification of the fourth embodiment, a plurality of medium slots 202 are disposed side by side in the Y direction.

Figure 33:
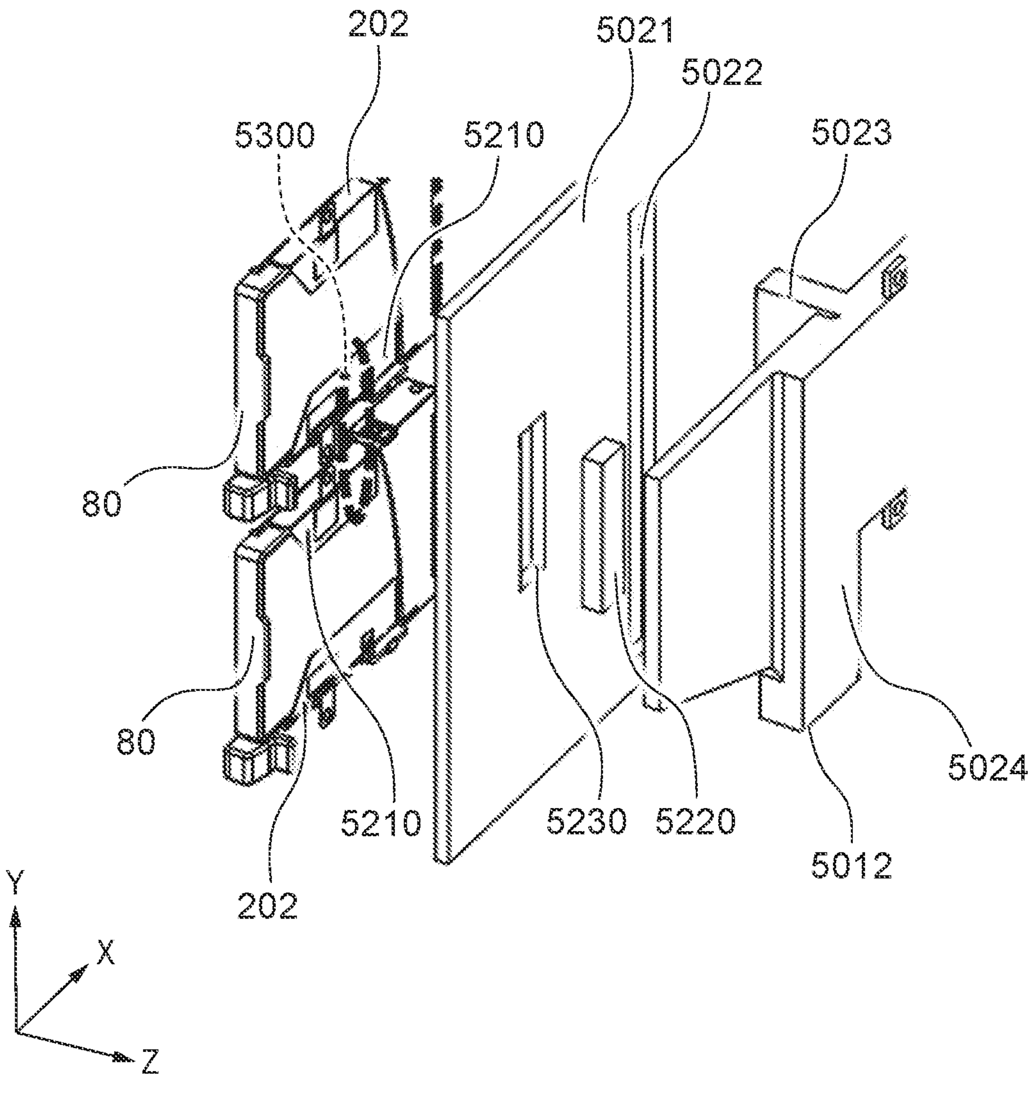
FIG. 33 is a front exploded perspective view of the control circuit board on which two medium slots are disposed.

FIG. 33 is a front exploded perspective view of the control circuit board 5021 on which the two medium slots 202 are disposed. Although in FIG. 33, the two medium slots 202 are disposed side by side in the Y direction, the number of the medium slots 202 may be three or more.

A portion 5300 surrounded by a broken line shown in FIG. 33 (hereinafter, referred to as "a broken-line-surrounded portion 5300") is an area where wraparound portions 5210 of the respective medium slots 202 are adjacent to each other. The through hole 5230 and the heat dissipating member 5220 are disposed so that the broken-line-surrounded portion 5300 and the first air-cooling duct 5024 are thermally connected to each other. Since the broken-line-surrounded portion 5300 is an area where the medium slots 202, which are heat sources, are close to each other, the broken-line-surrounded portion 5300 is a portion where heat tends to accumulate.

For this reason, the broken-line-surrounded portion 5300 and the first air-cooling duct 5024 are thermally connected to each other. As a result, even in the case that the plurality of medium slots 202 are mounted in the Y direction, the heat generated by the recording medium 80 within the medium slot 202 can be efficiently dissipated to the first air-cooling duct 5024.

It should be noted that in each of the embodiments described above, the term "substantially" does not mean to exclude "completely". For example, "substantially parallel", "substantially perpendicular", "substantially the same surface", and "substantially in the optical axis direction" include completely parallel, completely perpendicular, completely perpendicular, completely the same surface, and completely in the optical axis direction, respectively.

Although the present invention has been described above in detail based on its preferred embodiments, the present invention is not limited to these specific embodiments, and the present invention also includes various forms without departing from the gist of the invention. Some of the embodiments described above may be combined as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-032699, filed on Mar. 3, 2023, which is hereby incorporated by reference herein in its entirety.

What is claimed is:

1. An image pickup apparatus comprising:
- a first board that is substantially perpendicular to an optical axis direction;
- a second board that is disposed substantially parallel to the first board;
- a recording medium housing that is mounted on the second board and is capable of housing a recording medium;
- a gripping portion that is gripped when the image pickup apparatus is in use;
- a battery housing that is arranged so as to overlap the gripping portion on projection when viewed from the optical axis direction and is capable of housing a battery;
- a first air-cooling duct that is disposed between the battery housing and the second board;
- a fan that generates an air current within the first air-cooling duct,
- wherein the first air-cooling duct is thermally connected to at least one of the recording medium, the recording medium housing, or the second board.

2. The image pickup apparatus according to claim 1, wherein
- an image pickup device is mounted on the first board, and the image pickup device is thermally connected to the first air-cooling duct.

3. The image pickup apparatus according to claim 1, further comprising:
- a second air-cooling duct that is thermally connected to a main heat source on the second board.

4. The image pickup apparatus according to claim 3, further comprising:
- a connecting portion that connects the first air-cooling duct and the second air-cooling duct.

5. The image pickup apparatus according to claim 1, wherein
- an image pickup device is mounted on the first board, and the image pickup apparatus further comprises a drive mechanism that moves a unit including the image pickup device and the first board in a direction perpendicular to the optical axis direction.

6. The image pickup apparatus comprising:
- a first board that is substantially perpendicular to an optical axis direction;
- a second board that is disposed substantially parallel to the first board;

a recording medium housing that is mounted on the second board and is capable of housing a recording medium;

a battery housing that is arranged so as to overlap at least a portion of the recording medium housing when viewed from the optical axis direction and is capable of housing a battery;

a first air-cooling duct that is disposed between the battery housing and the second board; and a fan that generates an air current within the first air-cooling duct, wherein the first air-cooling duct is thermally connected to at least one of the recording medium, the recording medium housing, or the second board, and is disposed at a position that does not overlap the battery housing and overlaps the recording medium housing when viewed from the optical axis direction.

7. The image pickup apparatus according to claim 6, wherein the first air-cooling duct takes in air from a position that overlaps the recording medium housing when viewed from the optical axis direction.

8. The image pickup apparatus according to claim 6, wherein the first air-cooling duct includes a first wall that is adjacent to the second board and is substantially parallel to the second board in the optical axis direction, and a second wall that is provided at a position farther away from the second board than the first wall and is substantially parallel to the second board in the optical axis direction, and a heat transfer member, which is deformable, passes through the first wall and the second board, and abuts on both the recording medium and the second wall.

9. The image pickup apparatus according to claim 8, wherein a deformable range of the heat transfer member is longer than a distance between the first wall and the second wall in the optical axis direction.

10. The image pickup apparatus according to claim 9, wherein the first wall and the second wall are connected by a third wall, and the heat transfer member is housed in an area surrounded by the third wall.

11. The image pickup apparatus according to claim 10, wherein an abutment member is provided at a tip end of the heat transfer member, the heat transfer member abuts on the recording medium via the abutment member, and a slope is provided at an end portion of the abutment member.

12. The image pickup apparatus according to claim 1, wherein the second board includes an opening portion, an elastic heat transfer member is disposed in the opening portion, a first heat transfer portion of the elastic heat transfer member and the recording medium abut on each other, and a second heat transfer portion of the elastic heat transfer member is exposed into the first air-cooling duct from the opening portion.

13. The image pickup apparatus according to claim 12, wherein the second heat transfer portion protrudes into the first air-cooling duct.

14. The image pickup apparatus according to claim 12, wherein in the optical axis direction, the first air-cooling duct is disposed between the battery housing and the second board, and at least a portion of the battery housing also serves as a portion of the first air-cooling duct.

15. The image pickup apparatus according to claim 14, wherein at least a part of a portion of the battery housing which is exposed into the first air-cooling duct is constituted by a thermal conducting member.

16. The image pickup apparatus according to claim 14, wherein at least a portion of the second board also serves as a portion of the first air-cooling duct.

17. The image pickup apparatus according to claim 1, wherein the second board includes an opening portion, an elastic heat transfer member is disposed in the opening portion, a heat transfer sealing member that covers the opening portion is provided on a surface of the second board which is opposite to the recording medium, the heat transfer sealing member is exposed into the first air-cooling duct, a first heat transfer portion of the elastic heat transfer member and the recording medium abut on each other, and a second heat transfer portion of the elastic heat transfer member and the heat transfer sealing member abut on each other.

18. The image pickup apparatus according to claim 1, further comprising:

a second air-cooling duct; and a third air-cooling duct that connects the first air-cooling duct and the second air-cooling duct, and wherein in the second board, an opening portion, through which the third air-cooling duct passes, is formed near the recording medium housing, and at least one of the second air-cooling duct or the third air-cooling duct is thermally connected to the recording medium housing by a sheet-shaped heat dissipating member.

19. The image pickup apparatus according to claim 18, wherein the opening portion is located between a main heat source on the second board and the recording medium housing.

20. The image pickup apparatus according to claim 18, wherein a heat dissipating member is disposed in a through hole that is formed in an area of the second board which overlaps the recording medium housing on projection when viewed from the optical axis direction, and the recording medium housing and the first air-cooling duct are thermally connected to each other via the heat dissipating member.

21. The image pickup apparatus according to claim 20, wherein the recording medium is not exposed from the through hole toward the first air-cooling duct.

* * * * *